US008717193B2

(12) United States Patent
Velusamy

(10) Patent No.: US 8,717,193 B2
(45) Date of Patent: May 6, 2014

(54) METHOD AND SYSTEM FOR PROVIDING TRAFFIC ALERTS

(75) Inventor: Umashankar Velusamy, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 304 days.

(21) Appl. No.: 13/215,681

(22) Filed: Aug. 23, 2011

(65) Prior Publication Data

US 2013/0049987 A1 Feb. 28, 2013

(51) Int. Cl.

*G08G 1/09* (2006.01)
*B60Q 1/00* (2006.01)
*G06F 19/00* (2011.01)

(52) U.S. Cl.

USPC .................. 340/905; 340/425.5; 340/426.19; 340/539.13; 340/539.23; 701/117; 701/119; 701/32.3; 455/404.2; 455/412.2

(58) Field of Classification Search

USPC ........................................................ 340/905

See application file for complete search history.

(56) References Cited

U.S. PATENT DOCUMENTS 7,283,904 B2 * 10/2007 Benjamin et al. ............. 701/117

* cited by examiner

*Primary Examiner* — Donnie Crosland

(57) ABSTRACT

A method is provided for warning mobile users of traffic conditions. One or more sensor messages are monitored from a plurality of mobile devices transported by a plurality of vehicles. A traffic condition is determined based on the one or more sensor messages. Location of the traffic condition is also determined based on position information of one or more of the plurality of mobile devices. The mobile devices that are within a predetermined proximity to the location of the traffic condition are selected. An alert message is generated in response to the traffic condition. The selected mobile devices are notified with the alert message.

22 Claims, 15 Drawing Sheets

METHOD AND SYSTEM FOR PROVIDING TRAFFIC ALERTS

BACKGROUND INFORMATION

Traffic accidents occur routinely as a result of inattentiveness as well as unforeseen circumstances. For example, accidents can result from decreased visibility stemming from poor or inclement weather or other environmental conditions, such as smoke from a fire or a falling tree or rock. In addition to causing injuries and casualties, traffic accidents cause other negative effects, albeit less severe, such as the straining of roadway networks as well as resources associated with emergency responders. These effects are amplified if an accident involves many vehicles—as in a vehicle pileup on a highway. Despite the many advancements in mobile technology, traffic monitoring systems, and vehicle safety mechanisms, little effort has been dedicated to the seamless integration of these technologies to improve warning the drivers of potential hazards and accidents.

Accordingly, there is a need for an approach to provide more effective traffic warnings.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for warning of a traffic condition are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to alerting of traffic related conditions, it is contemplated that various exemplary embodiments are also applicable to other situations requiring monitoring and associated warning mechanism.

Figure 1:
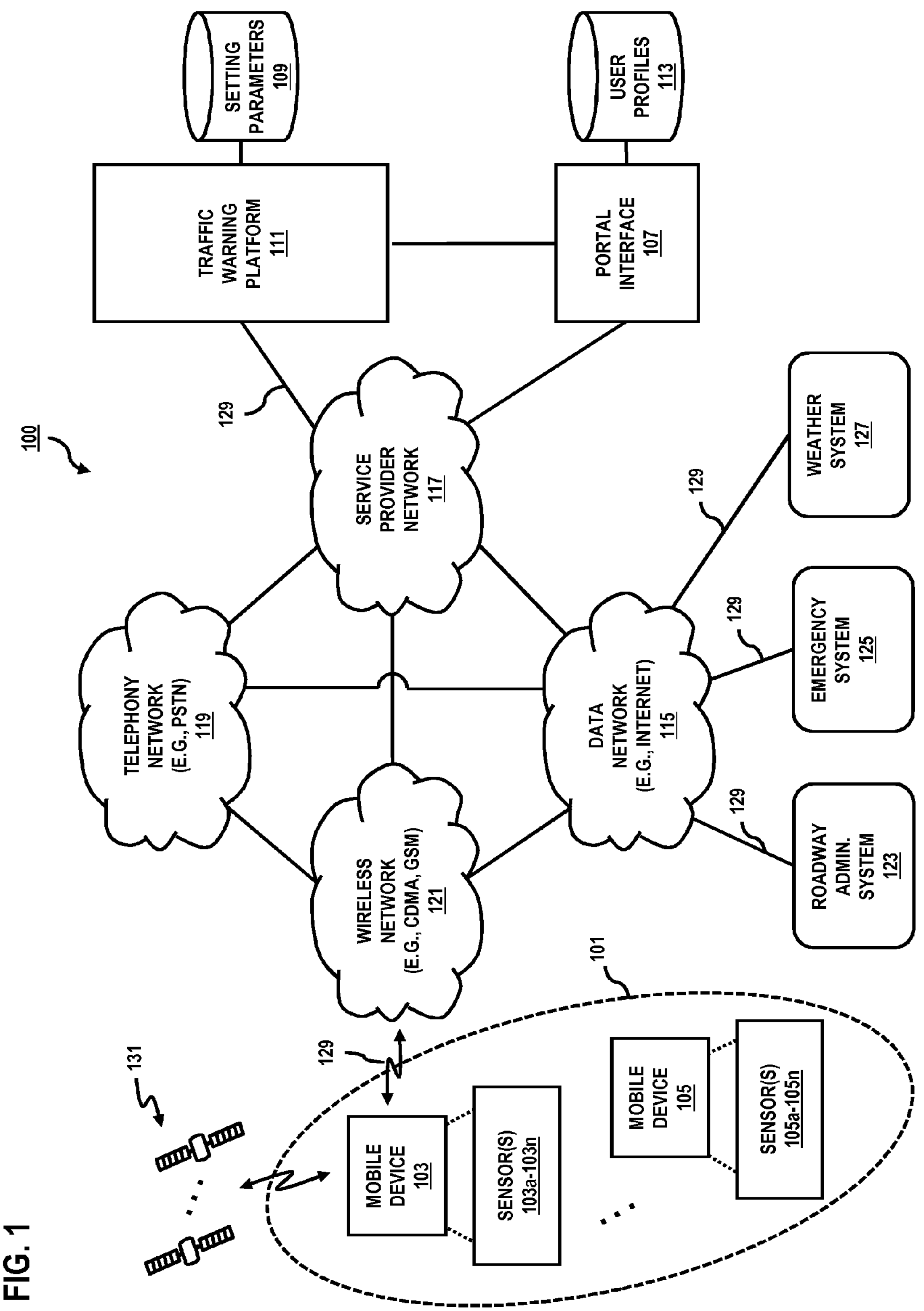
FIG. 1 is a diagram of a system capable of warning of a traffic condition, according to an exemplary embodiment.

FIG. 1 is a diagram of a system 100 capable of warning of a traffic condition, according to an exemplary embodiment. For the purposes of illustration, system 100 for warning of a traffic condition to one or more mobile devices within a user network 101 of mobile devices (an illustrated sample including mobile devices 103 and 105), such as one or more cellular phones, is described with respect to a portal interface 107. For example, users of mobile devices 103, 105 can be warned of a traffic condition that is geographically proximate to the devices 103, 105. Alert messages may be used by the device user to reduce the likelihood of negative effects on the device user as a result of the proximate event. In certain embodiments, a traffic condition pertains to any event or condition that can impact driving conditions and/or traffic flow; non-limiting examples include a vehicle accident, a vehicle pileup (multiple vehicle accident), blockage or debris on the road, unsafe driving patterns, inclement weather, a fire, etc. In exemplary embodiments, users at devices 103, 105 may access portal interface 107 to provide indications corresponding to traffic conditions near their mobile devices 103, 105. Based on the provided indications of respective mobile devices 103, 105, portal interface 107 may determine one or more warnings to be provided to other mobile devices within user network 101 and store these one or more warnings to a networked repository (e.g., warning repository 109) via traffic warning platform 111.

Exemplary embodiments of system 100 additionally facilitate remote configuration of mobile devices 103 and 105 by enabling subscribers (or users) to access portal interface 107 via one or more client devices (e.g., another mobile device (not shown)) to register to the remote configuration services and to create, customize, and/or manage one or more user profiles stored to, for example, user profiles repository 113 or any other suitable storage location of (or accessible to) the components or facilities of system 100. In this manner, subscribers may via, for example, a browser (or other networking application), access portal interface 107 over one or more of networks 113-119 to provide an indication corresponding to traffic conditions near their mobile devices.

System 100 includes a warning platform 111 that has connectivity to one or more source (or feeder) systems. In certain embodiments, source systems refer to sources for data, which can be presented in a variety of forms. For example, warning platform 111 collects or receives files containing data from one or more source systems and processes the data for storing. Also, sensor data from sensors 103*a*-103*n* and 105*a*-105*n* are utilized to determine traffic conditions for generation of alert messages. The data can be stored in any form of memory local to the source system or centrally, such as warning repository 109.

For purposes of illustration, warning repository 109 is depicted as a separate entity from that of warning platform 111. However, in exemplary embodiments, warning platform 111 may include the warning repository 109, and/or any other form of memory. The source systems can be associated with a single entity (organization, business, individual, etc.) or multiple distinct entities. In this example embodiment, source systems include a roadway administration system 123, an emergency system 125, a weather system 127. Roadway administration system 123 provides roadway information, e.g., closings, repair work, etc., to service subscribers. Emergency system 125 provides emergency information, e.g., roadway accident information, to service subscribers. Weather system 127 provides weather information to service providers. User network 101 includes multiple user devices that may bidirectionally communicate with one another to provide any type of information.

The collected data can be in the form of online analytical processing (OLAP) cubes built from the warning repository 109 to which data has been uploaded, and can be data that moves from one system to another system, etc. While specific reference will be made thereto, it is contemplated that the system 100 may embody many forms and include multiple and/or alternative components and facilities.

Under the scenario of FIG. 1, a service provider network 117 may include warning platform 111; under this arrangement, a data processing service can be provided as a managed service by the service provider network 117.

As mentioned, the process of collecting and processing plays a key role in the generation of warning alerts of the traffic conditions. Data collection can be periodically executed, for instance, at the end of a particular period (e.g., minute, day, week, month, etc.). The necessary information associated with events relating to traffic or the environment may come from numerous sources, such as weather monitoring services, police/fire (emergency) services, etc. As a significant portion warning of a traffic condition may include processing data from many different sources, the process of integrating different types of data can be a difficult, especially because the information may come from multiple sources that may be strongly decoupled and disparate from each other. Moreover, there may be a lack of adequate automated monitoring and status reporting, as well as communication gaps between data providers. Although each team may issue "alert messages" to other teams for missed files and processes, the "alert messages" may not be considered by all of those who are involved in the integration process because of manual and disparate processes (e.g., different means of communication, data delivered in different formats). As such, warning platform 111 serves as a bidirectional communication gap among one or more of roadway administration system 123, emergency system 125, weather system 127 and user network 101.

In one embodiment, warning platform 111 can be asynchronous system that can provide responses through extensible markup language (XML), web service calls, etc. For example, warning platform 111 can provide asynchronous responses through web service description language (WSDL) calls. Roadway administration system 123, emergency system 125, weather system 127 and user network 101 can communicate with the system 100 using various communications modes. In certain embodiments, roadway administration system 123, emergency system 125, weather system 127 and user network 101 can communicate with warning platform 111 using web service calls, emails, telephone calls, in-person conversations, instant messaging chats, etc. For example, roadway administration system 123, emergency system 125, weather system 127 and user network 101 may be members of an organization. In such an example scenario, the supervisors may utilize warning platform 111 to obtain reports containing status information relating to progress of the workflow towards completion, such that status information is estimated by correlating the workflow data with the one or more predetermined processes of a workflow.

In some embodiments, traffic warning platform 111 (as well as roadway administration system 123, emergency system 125, weather system 127) utilizes data management systems, wherein data can be stored in one or more data containers. Each container may contain records, and the data within each record may be organized into one or more fields. For example, in relational database systems, the data containers are referred to as tables, the records are referred to as rows, and the fields are referred to as columns. In object-oriented databases, the data containers are referred to as object classes, the records are referred to as objects, and the fields are referred to as attributes. In addition, the one or more data containers may contain user and system profiles. Other database architectures may use other terminology.

Roadway administration system 123, emergency system 125, weather system 127 and user network 101 may include any customer premise equipment (CPE) capable of sending and/or receiving data or information over one or more of networks 113, 115, 117 and 119. For instance, user network 101 may include a voice terminal that may be any suitable plain old telephone service (POTS) device, facsimile machine, etc., a mobile terminal that may be any cellular phone, radiophone, satellite phone, smart phone, wireless phone, or any other suitable mobile device, such as a personal digital assistant (PDA), pocket personal computer, tablet, customized hardware, etc.; a computing device that may be any suitable computing device, such as a voice over internet protocol (VoIP) phone, skinny client control protocol (SCCP) phone, session initiation protocol (SIP) phone, IP phone, personal computer, softphone, workstation, terminal, server, etc.

By way of example, roadway administration system 123 may be managed by a telephone service provider; as such, roadway administration system 123 can relate to a central office, a tandem office or any other entity that supplies data files to be integrated by warning platform 111. User network 101 may be managed by a telephone service provider or any other entity such as a forecasting authority (e.g., National Forecasting and Planning System (NFPS)), different from the telephone service provider that manages roadway administration system 123, which requires access to the integrated data. Once data such as information associated with the status of the execution of a workflow from each (or any) of roadway administration system 123, emergency system 125, weather system 127 and user network 101 is integrated by warning platform 111, the data (e.g., data associated with the status of a workflow), as well as status information, can be made available each (or any) of roadway administration system 123, emergency system 125, weather system 127 and user network 101 and used for various purposes, such as monitoring or completing a close process (e.g., financial accounting). For example, warning platform 111 may estimate status information relating to one or more processes of a workflow and report such estimated status information to user network 101. According to certain embodiments, each of roadway administration system 123, emergency system 125, weather system 127 and user network 101 may utilize different data formats for data of common interest to all of roadway administration system 123, emergency system 125, weather system 127 and user network 101. It is noted that incompatibility of data can involve the actual data structure.

In certain embodiments, warning platform 111 permits access to the converted or integrated data by the client systems to ensure compatibility with respect to the data and status information. Warning platform 111 can also make the data, as well as any estimated status information, available to the source systems. Warning platform 111, roadway administration system 123, emergency system 125, weather system 127 and user network 101 may communicate over a data network 115, such as the Internet or any other type of public or private network. Various secure file transfer protocols may be used to securely convey files and data to be processed from one or more of roadway administration system 123, emergency system 125, weather system 127 and user network 101 to warning platform 111 and from warning platform 111 to one or more of roadway administration system 123, emergency system 125, weather system 127 and user network 101 over one or more communication links (or connections) 129. For example, the one or more of roadway administration system 123, emergency system 125, weather system 127 and user network 101 may monitor one or more predetermined processes of a workflow and request warning platform 111 to provide an asynchronous response regarding the status of the one or more predetermined processes of a workflow. Links 129 may include wired (e.g. coaxial cable, twisted pair, fiber optic cable, etc.) and/or wireless connections.

In the example of FIG. 1, system 100 includes various communication networks, such as data network 115 and wireless network 121; these networks 113 and 115 can support telephony services for a mobile terminal to communicate over a telephony network 119 (e.g., Public Switched Telephone Network (PSTN). In this manner, roadway administration system 123, emergency system 125, weather system 127 and user network 101 can place and receive calls from, for example, a voice terminal. For the purpose of illustration, wireless network 121 can include a radio network that supports a number of wireless terminals, which may be fixed or mobile, using various radio access technologies. According to one exemplary embodiment, radio technologies that can be contemplated include: first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), 4G, etc. For instance, various mobile communication standards have been introduced, such as first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), and beyond 3G technologies (e.g., third generation partnership project (3GPP) long term evolution (3GPP LTE), 3GPP2 universal mobile broadband (3GPP2 UMB), etc.).

Complementing the evolution in mobile communication standards adoption, other radio access technologies have also been developed by various professional bodies, such as the Institute of Electrical and Electronic Engineers (IEEE), for the support of various applications, services, and deployment scenarios. For example, the IEEE 802.11 standard, also known as wireless fidelity (WiFi), has been introduced for wireless local area networking, while the IEEE 802.16 standard, also known as worldwide interoperability for microwave access (WiMAX) has been introduced for the provision of wireless communications on point-to-point links, as well as for full mobile access over longer distances. Other examples include Bluetooth™, ultra-wideband (UWB), the IEEE 802.22 standard, etc.

It is noted that system 100 may also include satellite positioning system (SPS) technology, such as GPS technology; however, any other suitable navigational or location determination technology may be utilized, such as advanced forward link trilateration (A-FLT), assisted-GPS (A-GPS), enhanced cellular identification (CELL-ID), wireless area network (WLAN) positioning, etc. According to exemplary embodiments, the SPS technology of system 100 may be configured to utilize a constellation 131 of satellites that transmit signals to receivers (not shown) of, for example, one or more mobile devices 103 and 105, so that the receivers may determine corresponding spatial positioning information (or locations), speeds, directions, and/or timing for mobile devices 103 and 105.

According to certain embodiments, a service provider network 117 includes warning platform 111; under this arrangement, the process integration (or data processing) service can be provided as a managed service by service provider network 117. It should be noted that various other types of networks may also be present within system 100 and are not limited to the described systems. Subscribers, for example, roadway administration system 123, emergency system 125, weather system 127 and user network 101 are also shown within FIG. 1 in communication with the assortment of networks. It should also be noted that roadway administration system 123, emergency system 125, weather system 127 and/or user network 101 may be associated with one or more of the described networks including wireless network 121 and telephony network 119.

In certain embodiments, warning platform 111 retrieves data over data network 115 for processing in the form of files (e.g., raw data files). Various secure file transfer protocols may be used to convey these files from source systems to warning platform 111, and from warning platform 111 to client systems. Links 129 that carry the data files may include both wired (e.g., coaxial cable, twisted pair, fiber optic cable) as well as wireless connections.

Figure 2:
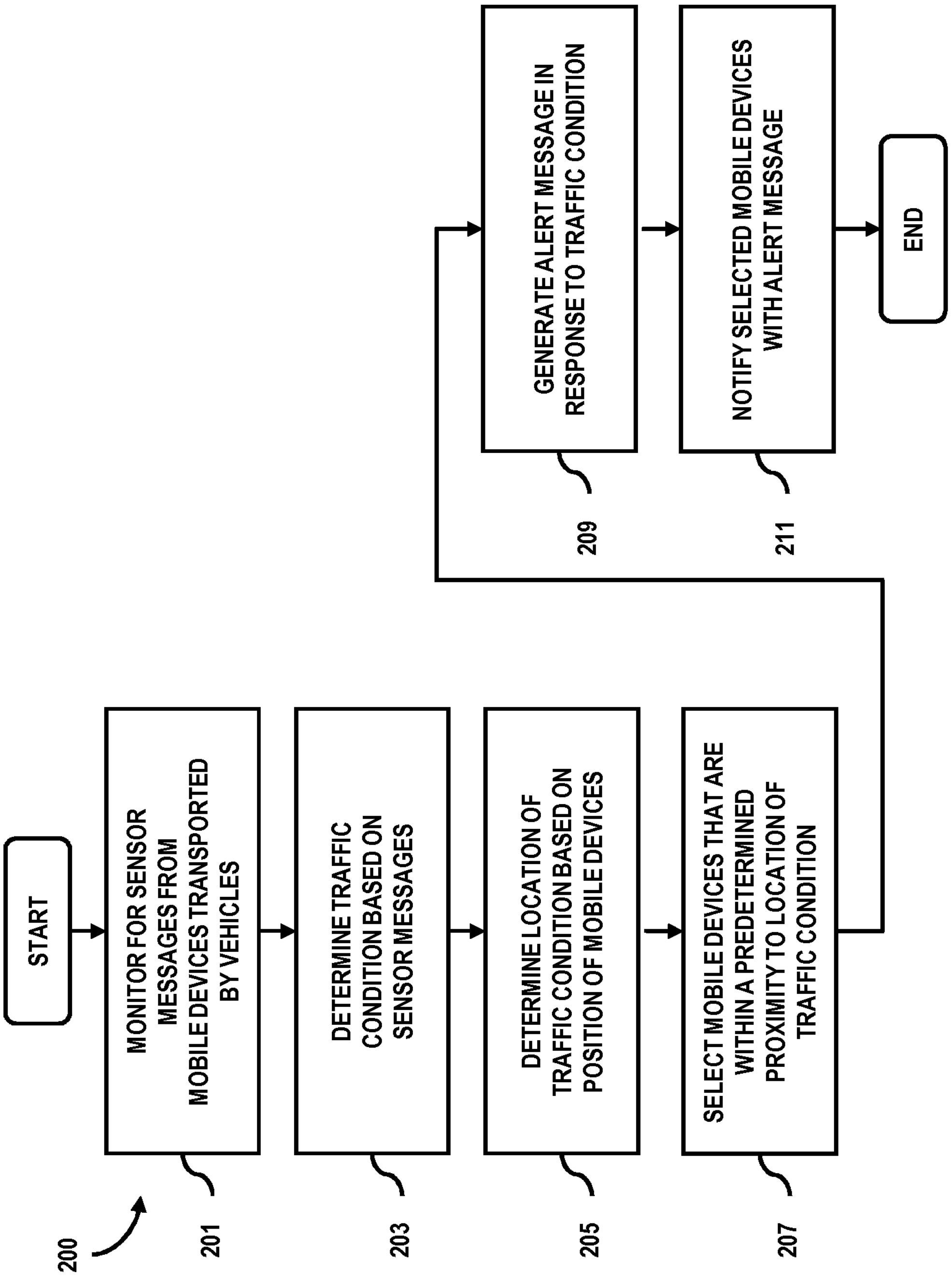
FIG. 2 is a flowchart of a process for warning a user of a traffic condition, according to an exemplary embodiment.

FIG. 2 is a flowchart of a process 200 for warning a user of a traffic condition, according to an exemplary embodiment. As shown in FIG. 2, in process 200, provides for the generation of alerts based on sensor messages and other data (e.g., sensor data of the vehicle). In step 201, warning platform 111 may monitor for sensor signals or messages from mobile devices 103, 105. Some mobile devices 103, 105 may be transported by vehicles, according to one embodiment. In step 203, a traffic condition is determined based on the one or more sensor messages transmitted by the mobile devices 103, 105. In one embodiment, sensor signals (e.g., airbag deployment) from the vehicle itself can be relayed by the mobile devices 103, 105 or sent directly to the warning platform 111. Next, location of the traffic condition is determined based on position information of one or more of the mobile devices 103, 105 (per step 205). Process 200 then selects, as in step 207, the mobile devices 103, 105 that are within a predetermined proximity to the location of the traffic condition. In step 209, an alert message is generated in response to the traffic condition. In step 211, the selected mobile devices 103, 105 are notified with the alert message. The selected mobile devices 103, 105 can be determined based on a subscription service, such that only subscribers will receive the traffic alerts.

A more detailed explanation of warning platform 111 is described with reference to FIG. 3.

Figure 3:
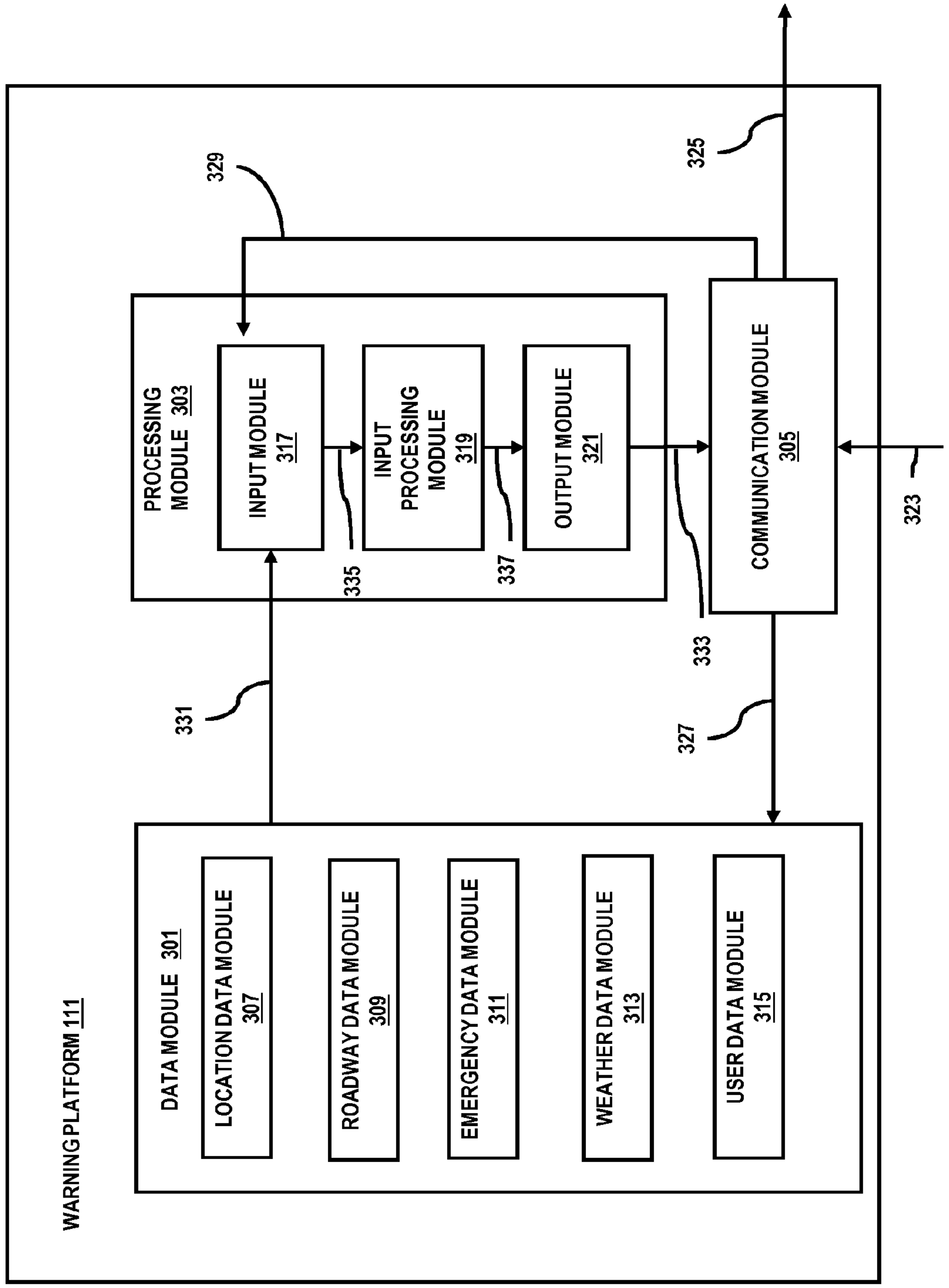
FIG. 3 is a diagram of a warning platform, according to an exemplary embodiment.

FIG. 3 is a diagram of a warning platform, according to an exemplary embodiment. As illustrated, warning platform 111 includes a data module 301, a processing module 303 and a communications module 305. Data module 301 includes a location (e.g., GPS) data module 307, a roadway data module, an emergency data module 311, a weather data module 313 and a user data module 315. Processing module 303 includes an input module 317, an input processing module 319 and an output module 321.

In this example, each of data module 301, processing module 303 and communications module 305 are distinct devices. However, in other embodiments, at least two of data module 301, processing module 303 and communications module 305 may be combined as a unitary device. Further, in some embodiments at least one of data module 301, processing module 303 and communications module 305 may be implemented as a non-transitory computer-readable media for carrying or having computer-executable instructions or data structures stored thereon. Such non-transitory computer-readable media can be any available media that can be accessed by a general purpose or special purpose computer. Non-limiting examples of non-transitory computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (hardwired and/or wireless, or a combination of hardwired or wireless) to a computer, the computer properly views the connection as a non-transitory computer-readable medium. Thus, any such connection is properly termed a non-transitory computer-readable medium. Combinations of the above should also be included within the scope of non-transitory computer-readable media.

In this example, each of GPS data module 307, roadway data module 309, emergency data module 311, weather data module 313 and user data module 315 are distinct devices. However, in other embodiments, at least two of GPS data module 307, roadway data module, emergency data module 311, weather data module 313 and user data module 315 may be combined as a unitary device. Further, in some embodiments at least one of GPS data module 307, roadway data module 309, emergency data module 311, weather data module 313 and user data module 315 may be implemented as a non-transitory computer-readable media for carrying or having computer-executable instructions or data structures stored thereon.

In this example, each of input module 317, input processing module 319 and output module 321 are distinct devices. However, in other embodiments, at least two of input module 317, input processing module 319 and output module 321 may be combined as a unitary device. Further, in some embodiments at least one of input module 317, input processing module 319 and output module 321 may be implemented as a non-transitory computer-readable media for carrying or having computer-executable instructions or data structures stored thereon.

Warning platform 111 is arranged to receive an input signal 323 and output an output signal 325.

Communications module is arranged to receive input signal 323 and to output a signal 327, a signal 329 and output signal 325. Data module 301 is arranged to receive signal 327 and output a signal 331. Processing module 303 is arranged to receive signal 329 and signal 331 and to output a signal 333. Communications module is additionally arranged to receive signal 333.

Input module 317 is arranged to receive signal 329 and signal 331 and to output a signal 335. Input processing module 319 is arranged to receive signal 335 and output a signal 337. Output module 321 is arranged to receive signal 337 and output signal 333.

Warning platform 111 may communicate with roadway administration system 123, emergency system 125, weather system 127 and user network 101 via links 129, as discussed above with reference to FIG. 1. Information received from roadway administration system 123, emergency system 125, weather system 127 and user network 101 via links 129 is input signal 323. Information provided to roadway administration system 123, emergency system 125, weather system 127 and user network 101 via links 129 is output signal 325.

Data module 301 manages data for warning platform 111.

Location data module 307 maintains, for example, GPS data. GPS data may be provided by constellation 131 of FIG. 1.

Roadway data module 309 maintains roadway data. Non-limiting examples of roadway data include data provided by a local highway administration, such as data relating to roadway construction. For example, roadway administration system 123 may provide roadway data to roadway data module 309 through signal 323.

Emergency data module 311 maintains emergency data. Non-limiting examples of emergency data include data provided by police and fire departments, such as data relating to fires, criminal activity and roadway accidents. For example, emergency system 125 may provide emergency data to emergency data module 311 through signal 323.

Weather data module 313 maintains weather data. Non-limiting examples of weather data include data provided by a weather service provided, such as data relating to freezing temperatures, precipitation, high winds, etc. For example, weather system 127 may provide weather data to weather data module 313 through signal 323.

User data module 315 maintains user data from other users within user network 101. Users within user network 101 may send many types of data, such as data relating to vehicular accidents, bad weather, etc. For example, a user within user network 101 may provide user data to user data module 315 through signal 323.

Processing module 303 processes data provided by data module 301 and data provided by communications module 305.

Input module 317 receives data from data module 301 as signal 331. For example; when data module 301 provides GPS data, location data module 307 provides GPS data to input module 317 as signal 331; when data module 301 provides roadway data, roadway data module 309 provides roadway data to input module 317 as signal 331; when data module 301 provides emergency data, emergency data module 311 provides emergency data to input module 317 as signal 331; when data module 301 provides weather data, weather data module 313 provides weather data to input module 317 as signal 331; and when data module 301 provides user data, user data module 315 provides user data to input module 317 as signal 331.

In some embodiments, input module 317 may receive data directly from any of roadway administration system 123, emergency system 125, weather system 127 and user network 101. In such cases, input module 317 may receive data from communications module 305 as signal 329. For example; when communications module 305 receives GPS data from constellation 131 as signal 323, communications module 305 may then provide the GPS data to input module 317 as signal 329. Also, when communications module 305 receives roadway data from roadway administration system 123 as signal 323, communications module 305 may then provide the roadway data to input module 317 as signal 329. Upon receiving emergency data from emergency system 125 as signal 323, communications module 305 may then provide the emergency data to input module 317 as signal 329; when communications module 305 receives weather data from weather system 127 as signal 323, communications module 305 may then provide the weather data to input module 317 as signal 329. Communications module 305 can receive user data from user network 101 as signal 323, and may then provide the user data to input module 317 as signal 329.

Input processing module 319 processes the data provided by input module 317 as signal 335. In accordance with aspects of the present invention, input processing module 319 processes the data to determine whether a traffic condition has occurred, and whether a warning should be issued as a result of the traffic condition. For example, a police department (e.g., emergency system 125) may provide information (e.g., via link 129) regarding the vehicle accident at specific location along a specific road. In some embodiments, this information may be provided to input module 317 by way of data module 301, or directly by way of signal 329. Either way, input module 317 may provide the data related to the vehicle accident to input processing module 319. Input processing module may then determine whether a traffic condition warning needs to be issued.

Output module 321 outputs information for processing module 303. For example, in the event a traffic condition warning needs to be provided, output module 321 may provide the traffic condition warning to communications module 305. Communications module 305 may then output the traffic condition warning for the user.

Figure 4:
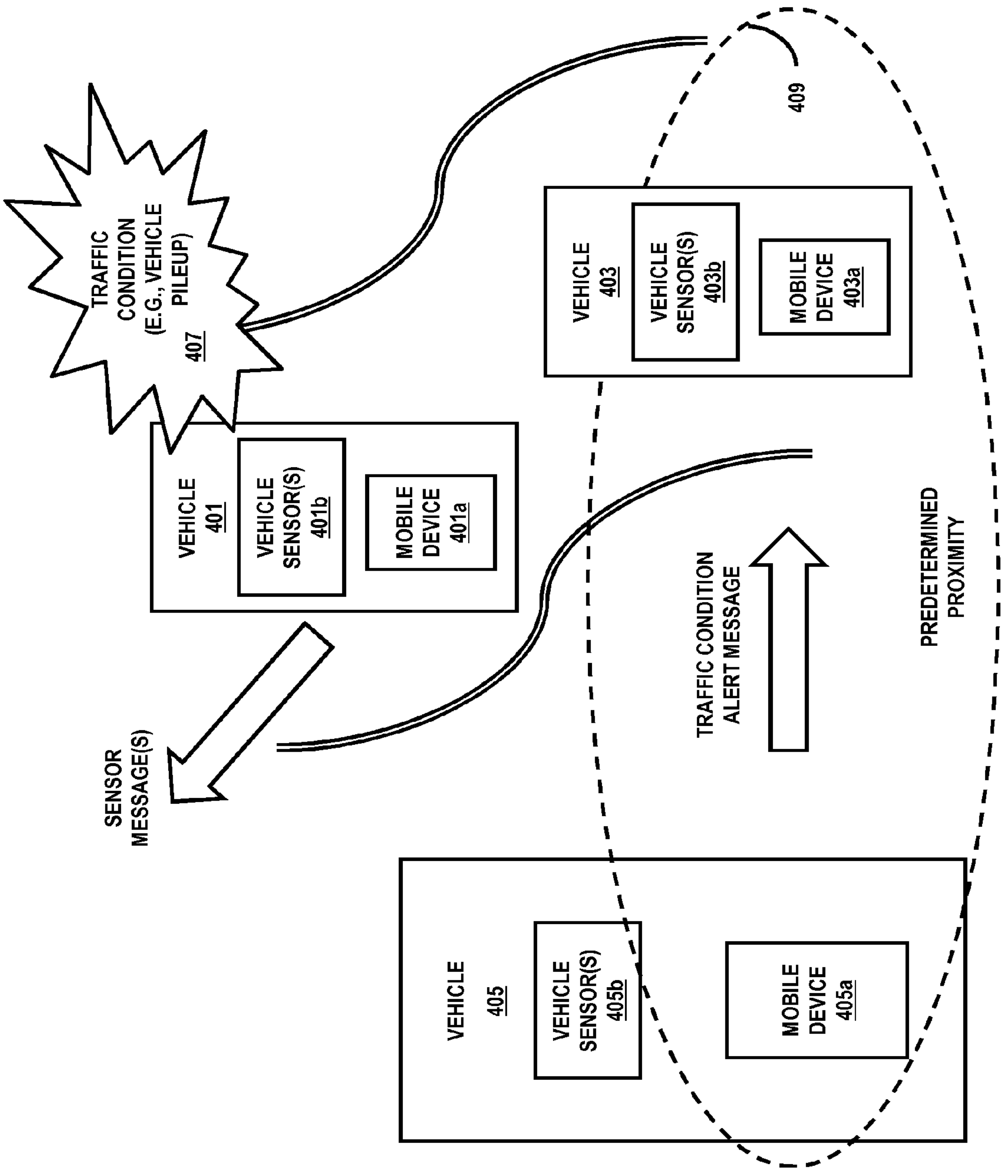
FIG. 4 is a diagram of an example involving generation of a traffic alert in a traffic condition, according to one embodiment.

FIG. 4 is a diagram of an example involving generation of a traffic alert in a traffic condition, according to one embodiment. As shown, a vehicle 401 and a vehicle 403 are traveling on a road, e.g., a highway, with poor visibility. Also, yet another vehicle 405 is within a certain proximity of vehicle 403. Vehicle 401 approaches a traffic condition 407, which is a vehicle pileup. In this example, it is assumed that vehicle 401 has a driver or passenger with a mobile device 401*a*. In this example, the mobile device 401*a* executes a traffic monitoring application that can send a sensor message to warning platform 111 about the traffic condition 407. Additionally, the vehicle 401 may be equipped to convey sensor information from one or more vehicle sensors 401*b* directly or through the mobile device 401*a*; the communication between the vehicle's communications electronics/computer system can be wireless, e.g., BLUETOOTH.

As noted, the traffic condition 407 may be determined based on sensor messages from the mobile devices and the vehicle itself. Such vehicles can utilize on-board diagnostic and control systems that may be remotely controlled and/or monitored by either the warning platform 111 or another system. By way of example, a large deceleration can be detected by an accelerometer within the mobile device, or a deployment of an airbag, may be messages from vehicle sensors that indicate an accident of a vehicle. These types of sensor messages may be provided to warning platform 111 to indicate that the vehicle has been in an accident.

The location of the traffic condition may be determined based on the position of the mobile devices; namely, mobile device 401*a* in this case. That is, the vehicle 401 in traffic condition 407 had provided sensor messages to warning platform 111, indicating that the vehicle was in traffic condition 407. Input processing module 319 may use GPS data corresponding to the vehicle in traffic condition 407, from GPS data module 307, to determine the location of the vehicle in traffic condition 407.

Mobile devices within a predetermined proximity to the location of the traffic condition are then selected. As shown in FIG. 4, vehicle 401 is at the location of traffic condition 407, and that vehicles 403 and 405 are within a predetermined proximity to traffic condition 407. The proximity may be configured by the user or the service provider. A large proximity will provide a large number of mobile devices that will be warned. However, in such a case, many of the warned devices may not need to be warned because they are too far away from the traffic condition to be affected. On the contrary, a small proximity will provide a small number of mobile devices will be warned. However, in such a case, there may be many devices that will not be warned (as they are outside of the small proximity), but will be close enough to the traffic condition to be affected.

An alert message is then generated in response to the traffic condition 407. For example, with respect to FIG. 3, input processing module 319 may generate an alert message. Based on data provided by data module 301, the alert message may indicate that a traffic condition is located at a specific location.

Continuing with the example, mobile device 405*a*, which has a subscription to the warning service, can receive the notification message about the traffic condition 407 and initiate measures to avoid the pileup. For example, returning to FIG. 3, communications module 305 may send the alert message generated by input processing module 319 to mobile devices that are within the predetermined proximity.

Moreover, mobile device 405 itself can alert a friend/colleague/family member within a proximity area 409; namely, mobile device 403*a* is a family member who can receive the traffic condition alert message via an automatically generated short messaging service (SMS) message, in one embodiment. In effect, mobile devices 405*a* and 403*a* (as well as other devices within the proximity of the traffic condition) can form an instant network to communicate the alert message, thereby efficiently coordinating avoidance of the pileup. This arrangement advantageously eliminates the need to have platform 111 initiate the various communications; such reduced processing on part of the platform 111 enables a more scalable approach to the notification mechanism.

Alternatively, mobile 405*a*, as a subscriber, may have a user profile that permits the warning platform 111 to alert certain designated users directly (although they are not subscribers).

It is noted that some parts of the roadway (e.g., intersections) may be prone to high accident rates. Such information can be retained by warning platform 111, so that the platform 111 can be optimized to generate more alerts when subscribers are travelling near the troublesome area. For example, if a service subscriber is driving on a road and is approaching a dangerous section of the road, the service subscriber will receive an alert that the particular stretch of road is in an accident prone area (e.g., due to driving patterns and/or weather conditions). This determination of accident proneness, for instance, may be based on historic traffic patterns. As such, a service provider, via platform 111, can catalog traffic conditions that have a high probability of causing accidents. In some embodiments, platform 111 may inform the subscriber that weather may adversely affect driving conditions. The weather information may be obtained from any weather data provider, e.g., the National Oceanographic and Atmospheric Administration. In some embodiments, the service provider may inform the subscriber that a weaving motorist is approaching, and that extra vigilance is required.

Figure 5:
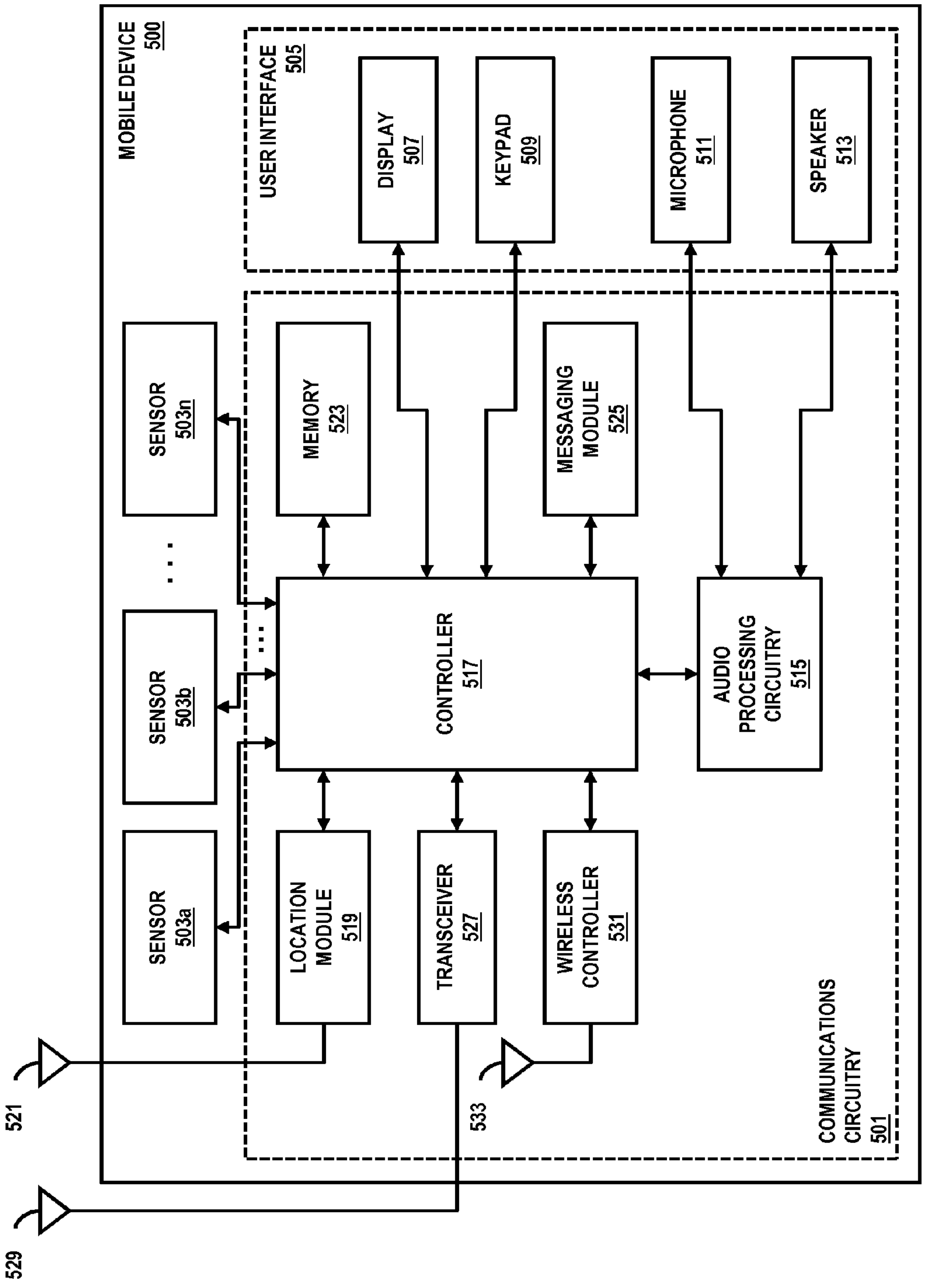
FIG. 5 is a diagram of a mobile device configured to warn of a traffic condition, according to an exemplary embodiment

FIG. 5 is a diagram of a mobile device configured to warn of a traffic condition, according to an exemplary embodiment. Mobile device 500 may comprise computing hardware (such as described with respect to FIG. 13), as well as include one or more components configured to execute the processes described herein for facilitating the remote configuration services of system 100. In this example, mobile device 500 includes communications circuitry 501, sensors 503*a*-503*n*, and user interface 505. While specific reference will be made hereto, it is contemplated that mobile device 500 may embody many forms and include multiple and/or alternative components. Sensors 503*a*-503*n* may be any known sensor, non-limiting examples of which include accelerometers, light sensors, power sensors, electronic compass, etc.

According to exemplary embodiments, user interface 505 may include one or more displays 507, keypads 509, microphones 511, and/or speakers 513. Display 507 provides a graphical user interface (GUI) that permits a user of mobile device 500 to view dialed digits, call status, menu options, and other service information. The GUI may include icons and menus, as well as other text and symbols. Keypad 509 includes an alphanumeric keypad and may represent other input controls, such as one or more button controls, dials, joysticks, touch panels, etc. As such, a user may utilize one or more components of user interface 505 to construct user profiles, enter commands, initialize applications, input remote addresses, select options from menu systems, and the like. In this manner, it is noted that microphone 511 coverts spoken utterances of a user (or other auditory sounds, e.g., environmental sounds) into electronic audio signals, whereas speaker 513 converts audio signals into audible sounds.

Communications circuitry 501 may include audio processing circuitry 515, controller 517, location module 519 (such as a GPS receiver) coupled to antenna 521, memory 523, messaging module 525, transceiver 527 coupled to antenna 529, and wireless controller 531 coupled to antenna 533. Memory 523 may represent a hierarchy of memory, which may include both random access memory (RAM) and read-only memory (ROM). Computer program instructions and corresponding data for operation can be stored in non-volatile memory, such as erasable programmable read-only memory (EPROM), electrically erasable programmable read-only memory (EEPROM), and/or flash memory. Memory 523 may be implemented as one or more discrete devices, stacked devices, or integrated with controller 517. Memory 523 may store information, such as one or more user profiles, one or more user defined policies, one or more contact lists, personal information, sensitive information, work related information, configurable setting parameters, and the like.

Even though not illustrated, it is contemplated that mobile device 500 may also include one or more applications and, thereby, may store (via memory 523) data (and/or setting parameters) associated with these applications for providing users with browsing functions, business functions, calendar functions, communication functions, contact managing functions, data editing (e.g., database, word processing, spreadsheets, etc.) functions, financial functions, gaming functions, imaging functions, location determination functions, messaging (e.g., electronic mail, instant messaging, enhanced messaging, multimedia messaging, short messaging, etc.) functions, multimedia functions, service functions, storage functions, synchronization functions, task managing functions, querying functions, and the like. As such, control messages received by mobile device 500 from, for example, traffic warning platform 111 may be utilized by one or more of sensors 503*a*-503*n* and/or controller 517 to facilitate remote configuration, modification, and/or utilization of one or more features, options, settings, etc., of these applications. It is also contemplated that these (or other) control messages may be utilized by controller 517 to facilitate remotely backing up and/or erasing data associated with these applications. In other instances, the control messages may cause mobile device 500 to become completely or partially deactivated or otherwise inoperable.

Accordingly, controller 517 may be configured to control the operation of mobile device 500, such as in response to commands received from sensors 503*a*-503*n* and/or data stored to memory 523. Control functions may be implemented in a single controller or via multiple controllers. Suitable controllers 517 may include, for example, both general purpose and special purpose controllers and digital signal processors. Controller 517 may interface with audio processing circuitry 515, which provides basic analog output signals to speaker 513 and receives analog audio inputs from microphone 511. In exemplary embodiments, controller 517 may be controlled by sensors 503*a*-503*n* in order to "lock" access to memory 523 and, thereby, prevent data disclosure therefrom, enable one or more communication limitations (e.g., limiting voice and messaging communications via messaging module 525 and transceiver 527 to certain designated directory addresses, disabling data communication functions of controller 517, etc.) to prevent unauthorized use of mobile device 500, image (or backup) memory 523 to prevent complete loss of information stored to memory 523, format (or erase) memory 523 to purge mobile device 500 of personal or otherwise sensitive information, as well as perform other similar or suitable actions to safeguard information stored to and prevent unauthorized use of mobile device 500. For example, other suitable actions may include configuring presentations of display 507 to ask for help in returning mobile device 500 to its rightful owner, defining one or more contact addresses within memory 523 for the rightful owner to be reached, configuring one or more audio, visual, and/or tactile alerts to be presented via display 507, speaker 513, and/or other user interface components of mobile device 500 so as to bring attention to mobile device 500, "bricking" mobile device 500 to prevent subsequent use of mobile device 500, causing location module 519 to determine spatial positioning information corresponding to a location of mobile device 500, and the like. It is noted that, in certain embodiments, the control messages may be utilized to transmit spatial positioning information, memory images, etc., to one or more destinations via transceiver 527 and/or wireless controller 531. In this manner, controller 517 and/or one or more of sensors 503*a*-503*n* may be remotely configured and/or controlled via received control messages that cause mobile device 500 to perform one or more specified actions.

It is noted that real time spatial positioning information may be obtained or determined via location module 519 using, for instance, satellite positioning system technology, such as GPS technology. In this way, location module 519 can behave as (or substantially similar to) a GPS receiver. Thus, mobile device 500 employs location module 519 to communicate with constellation 131 of satellites. The satellites within constellation 131 transmit very low power interference and jamming resistant signals received by GPS receivers 519 via, for example, antennas 521. At any point on Earth, GPS receiver 519 can receive signals from multiple satellites, such as six to eleven. Specifically, GPS receiver 519 may determine three-dimensional geolocation (or spatial positioning information) from signals obtained from at least four satellites. Measurements from strategically positioned satellite tracking and monitoring stations are incorporated into orbital models for each satellite to compute precise orbital or clock data. Accordingly, GPS signals may be transmitted over two spread spectrum microwave carrier signals that can be shared by GPS satellites within constellation 131. Thus, if mobile device 500 is able to identify signals from at least four satellites within constellation 131, receivers 519 may decode the ephemeris and clock data, determine the pseudo range for each satellite within constellation 131 and, thereby, compute the spatial positioning of a receiving antenna 521. With GPS technology, mobile device 500 can determine its spatial position with great accuracy and convenience. It is contemplated, however, that location module 519 may utilize one or more other location determination technologies, such as advanced forward link triangulation (AFLT), angle of arrival (AOA), assisted GPS (A-GPS), cell identification (cell ID), observed time difference of arrival (OTDOA), enhanced observed time of difference (E-OTD), enhanced forward link trilateration (EFLT), network multipath analysis, and the like.

Mobile device 500 also includes messaging module 525 that is configured to receive, transmit, and/or process messages (e.g., EMS messages, SMS messages, MMS messages, IM messages, electronic mail messages, and/or any other suitable message) received from (or transmitted to) any suitable component or facility of system 100, as well as from (or to) one or more other mobile devices (not shown) or destinations. As previously mentioned, traffic warning platform 111 may transmit control messages to mobile device 500 in the form of one or more programmable interface directed messages, e.g., one or more BREW directed control messages. As such, messaging module 525 and/or controller 517 may be configured to identify such control messages, as well as activate and/or configure one or more of sensors 503*a*-503*n*, in response thereto. Furthermore, messaging module 525 may be further configured to parse setting parameters from these control messages and, thereby, port parsed setting parameters to corresponding components of mobile device 500, such as sensors 503*a*-503*n*, controller 517, location module 519, memory 523, transceiver 527, wireless controller 531, display 507, speaker 513, etc., for implementation. Accordingly, sensors 503*a*-503*n* (once activated) may be configured to effectuate one or more actions specified by received setting parameters, such as for remotely controlling, configuring, monitoring, tracking, etc., mobile device 500.

It is also noted that mobile device 500 can be equipped with wireless controller 531 to communicate with a wireless headset (not shown) or other wireless network. The headset can employ any number of standard radio technologies to communicate with wireless controller 531; for example, the headset can be BLUETOOTH enabled. It is contemplated that other equivalent short range radio technology and protocols can be utilized.

Figure 6:
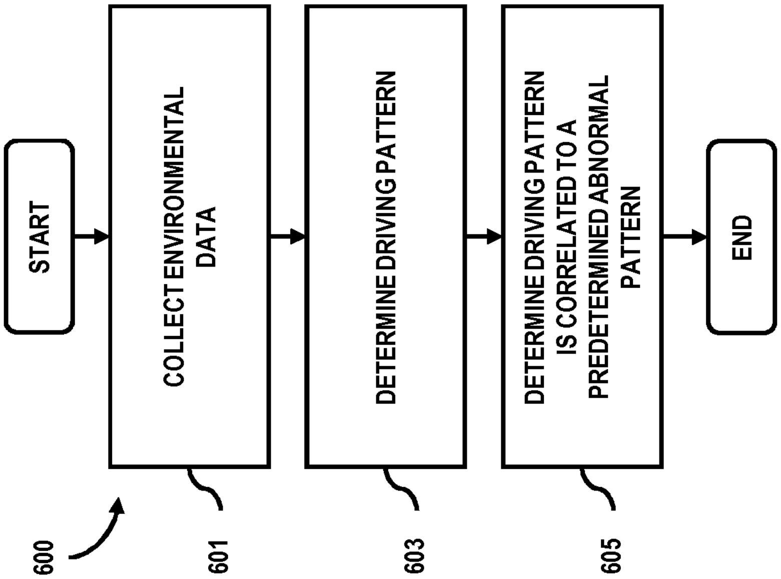
FIG. 6 is a flowchart of a process for accounting for environmental conditions, according to an exemplary embodiment.

FIG. 6 is a flowchart of a process 600 for accounting for environmental conditions, according to an exemplary embodiment. As shown in FIG. 6, process 600 involves collecting environmental data (step 601). Weather data module 313 may provide weather data to input processing module 319. Information relating to weather conditions, such as fog, snow or rain that may affect visibility, are gathered. Emergency conditions such as a building fire or bad accident as provided by emergency data module 311 may be collected as well. Further, localized environmental conditions may be supplemented by mobile devices within user network 101. For example, an individual driving through a patch of fog may provide such an indication to warning platform 111.

A driving pattern is then determined (per step 603) based on GPS information and sensors from the subject mobile device. For example, the mobile device may have a programmed driving route using a GPS application. The driving pattern is then correlated to a predetermined abnormal pattern, per step 605. For example, the driving route (of the mobile device of network 101 that has a programmed driving route as discussed above) may be correlated with the gathered environmental data. By using GPS data, for example as provided by GPS data module 307, input processing module 319 may determine whether any environmental conditions that may affect driving conditions are within the programmed driving route.

Figure 7:
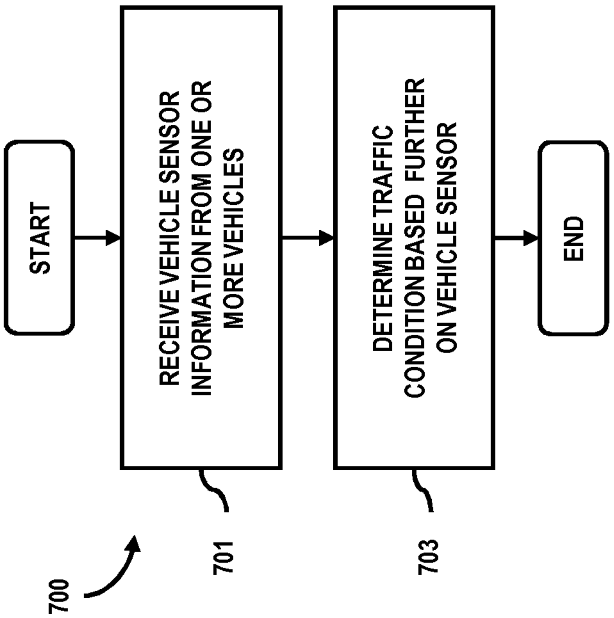
FIG. 7 is a flowchart of a process of accounting for vehicle conditions, according to an exemplary embodiment.

FIG. 7 is a flowchart of a process 700 of accounting for vehicle conditions, according to an exemplary embodiment. As shown in FIG. 7, process 700 starts with vehicle sensor information being received, as in step 701. For example, as mentioned above, some vehicles may have on-board diagnostic and control systems that may be remotely controlled and/or monitored. These systems may provide warning platform 111 with vehicle sensor information.

In step 703, a traffic condition can be determined based further on the vehicle sensor information. For example, returning to FIG. 4, for purposes of explanation, it is assumed that vehicle 401 stalls. In such a case, vehicle 401 may now be an obstacle within the driving route of vehicle 403. Sensor 401*b* of vehicle 401 may provide sensor information to warning platform 111 indicating the vehicle 401 has stalled. As such, the vehicle sensor information from vehicle 401 is used to determine a traffic condition. This information may then be used to generate a warning for vehicles 403 and 405, for instance.

Figure 8:
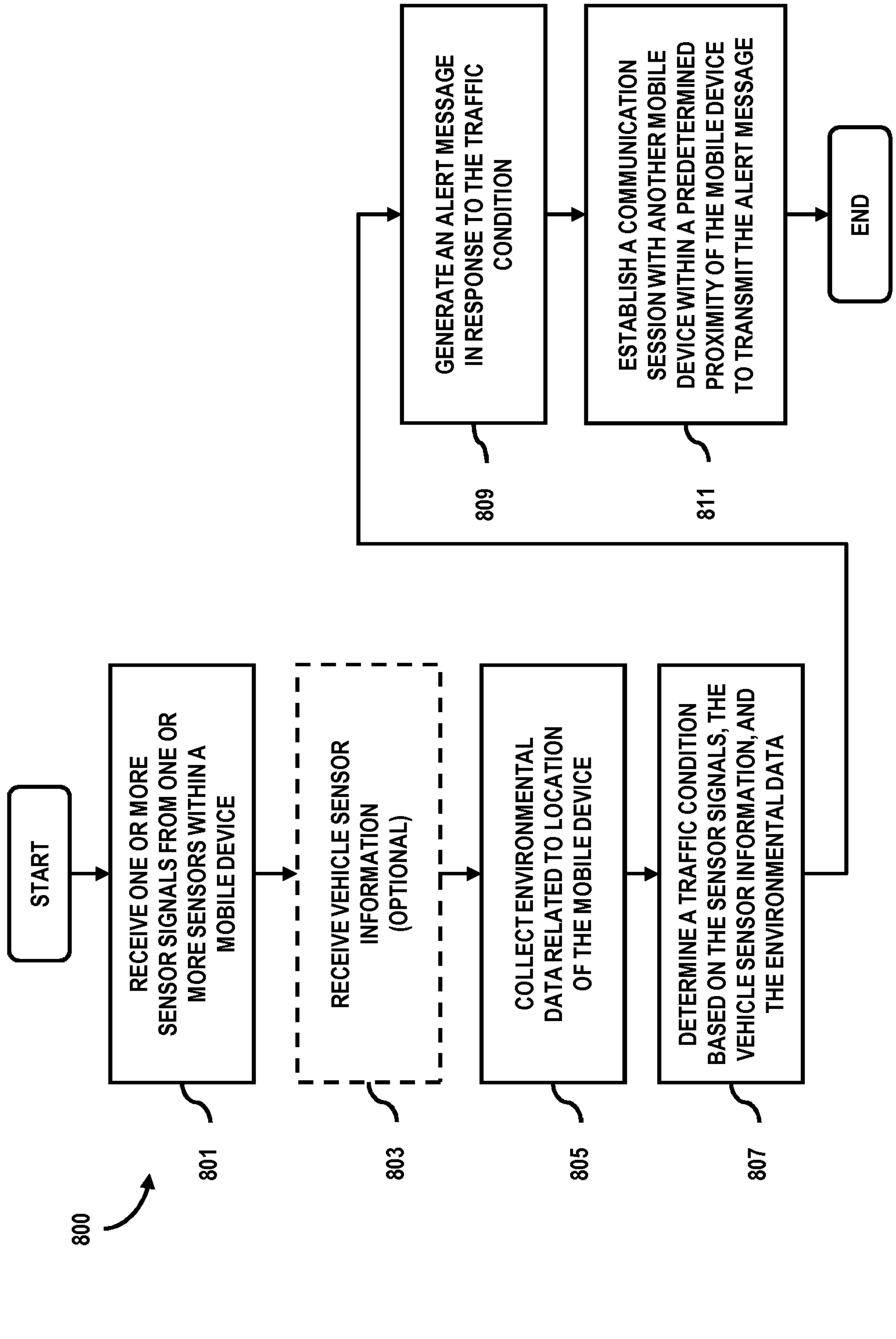
FIG. 8 is a flowchart of a process of accounting for vehicle conditions and mobile device sensor signals, according to an exemplary embodiment.

FIG. 8 is a flowchart of a process 800 of accounting for vehicle conditions and mobile device sensor signals, according to an exemplary embodiment. As shown, process 800 starts with sensor signals being received (step 801). For example one or more sensor signals may be received by one or more sensors within a mobile device, a discussed above with respect to FIG. 5. Optionally, vehicle sensor information may additionally be received (per step 803). In step 805, environmental data is collected; such environmental data can be related to the location of a mobile device, as explained with reference to FIG. 6.

At this time, a traffic condition is determined based on the sensor signals, the vehicle sensor information and the environmental data (per step 807). For example, returning to FIG. 3, input processing module 319 may determine a traffic condition based on data from any/all the data modules within data module 301. Then, in step 809, an alert message is generated. For example, input processing module 319 may generate an alert message in response to the traffic condition.

Finally, a communication session is established with another mobile device within a predetermined proximity to transmit the alert message, as in step 811.

Figure 9A:
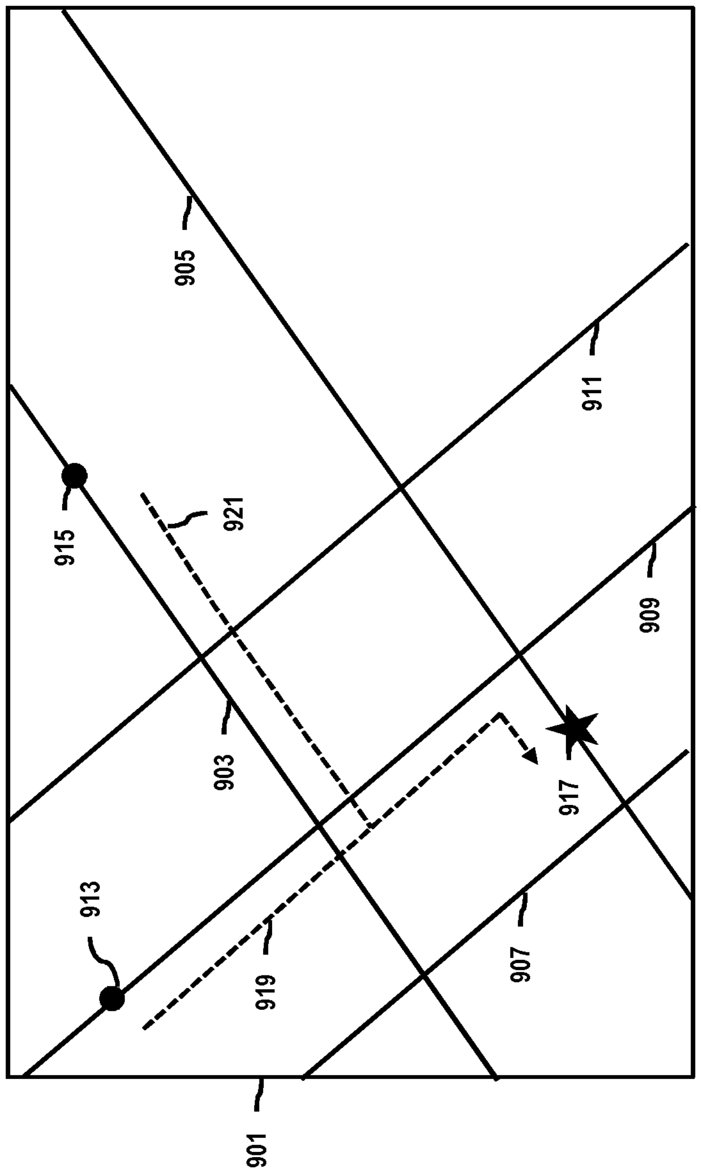
FIGS. 9A-9C are diagrams of schematic representations of exemplary traffic in an area at separate timing periods.
Figure 9B:
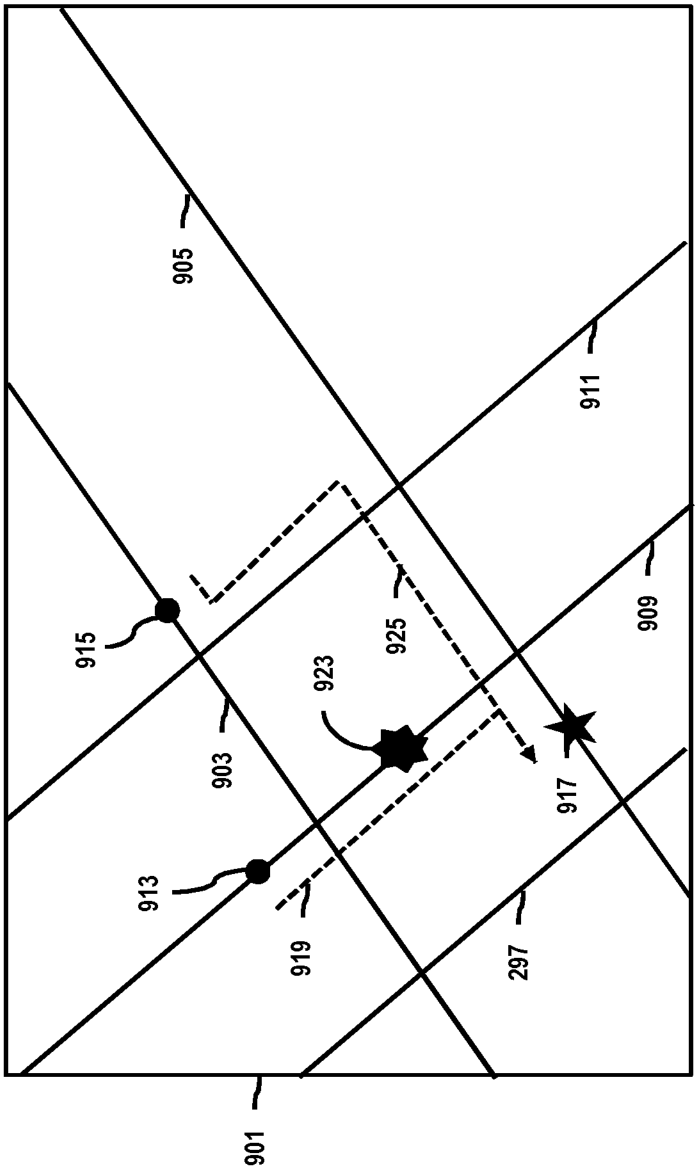
Figure 9C:
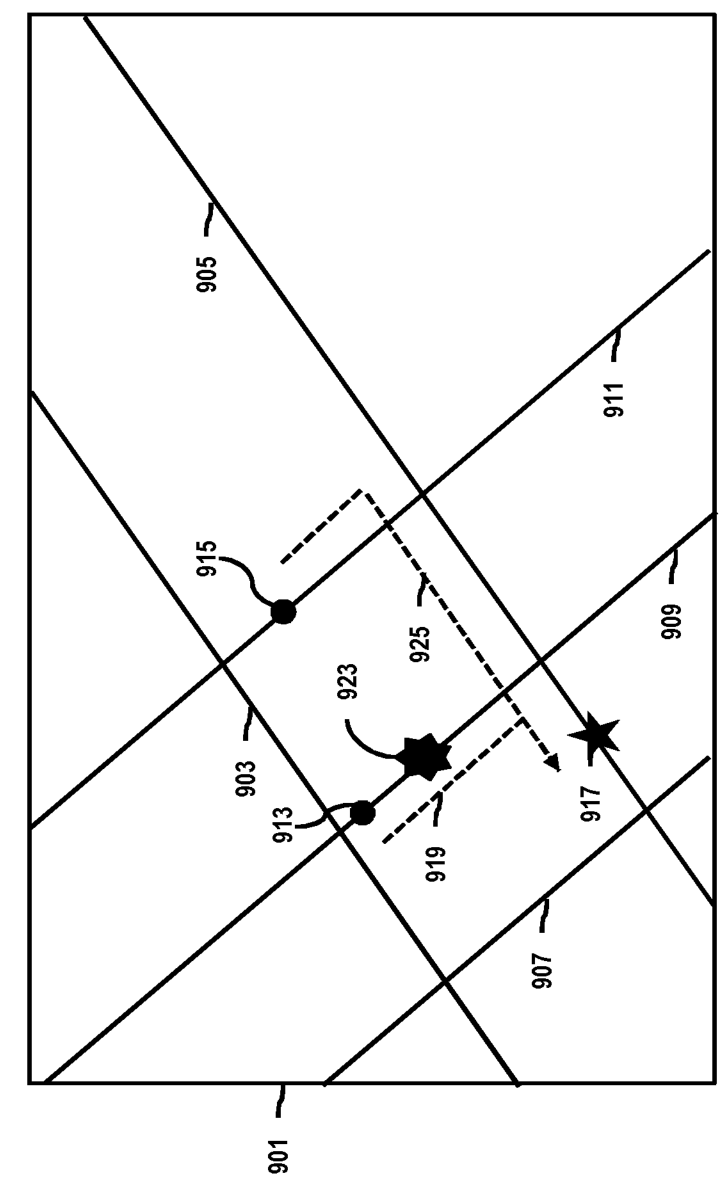

FIGS. 9A-9C are diagrams of schematic representations of exemplary traffic in an area at separate timing periods. Specifically, FIG. 9A represents an area 901 at a time $t_0$. FIG. 9B represents area 901 at a time $t_1$. FIG. 9C represents area 901 at a time $t_2$. As illustrated in FIG. 9A, area 901 includes northeast/southwest traveling roads 903 and 905 and northwest/southeast traveling roads 907, 909 and 911. For purposes of discussion, it is assumed that there is a high volume of traffic on each of roads 903, 905, 907, 909 and 911. Among the traffic, a vehicle 913 is traveling along road 909 to a destination 917 and a vehicle 915 is traveling along road 903 to destination 917.

In this example, at time $t_0$, vehicle 913 is planning to travel along a travel route 919, which includes traveling along road 909 to road 905, then to destination 917. At time $t_0$, vehicle

915 is planning to travel along a travel route 921, which includes traveling along road 903 to road 909, then to road 905 and then to destination 917.

As illustrated in FIG. 9B, in this example, at time $t_1$, a traffic accident occurs at location 923 on road 909. In fact, the traffic accident results, for example, from a dense fog that has greatly decreased visibility. Further, as a result of the decreased visibility, an original accident has grown into a multi-car pileup because vehicles entering the fog cannot see the original accident in time to stop.

Under this exemplary scenario, the drivers of vehicles 913 and 915 have respective communication devices within user network 101. As such, each of the drivers of vehicles 913 and 915 can receive a traffic condition warning. In particular, in this example, each of the drivers of vehicles 913 and 915 shall receive a warning of the accident at location 923 on road 909. With the traffic condition warning, each of the drivers of vehicles 913 and 915 may be able to decide on an appropriate response to the warning.

As illustrated in FIG. 9C, at time $t_2$, the driver of vehicle 915 has decided to change its travel route to avoid road 909, thus avoiding the accident at location 923. In particular, vehicle 915 now is planning to travel along a travel route 925, which includes traveling along road 903 to road 911, then to road 905 and then to destination 917. Alternatively, the driver of vehicle 913 has decided to continue on travel rout 919. However, the driver of vehicle 913 is driving more alert and thus is able to avoid the pileup even though there is limited visibility as a result of the fog.

Figure 10:
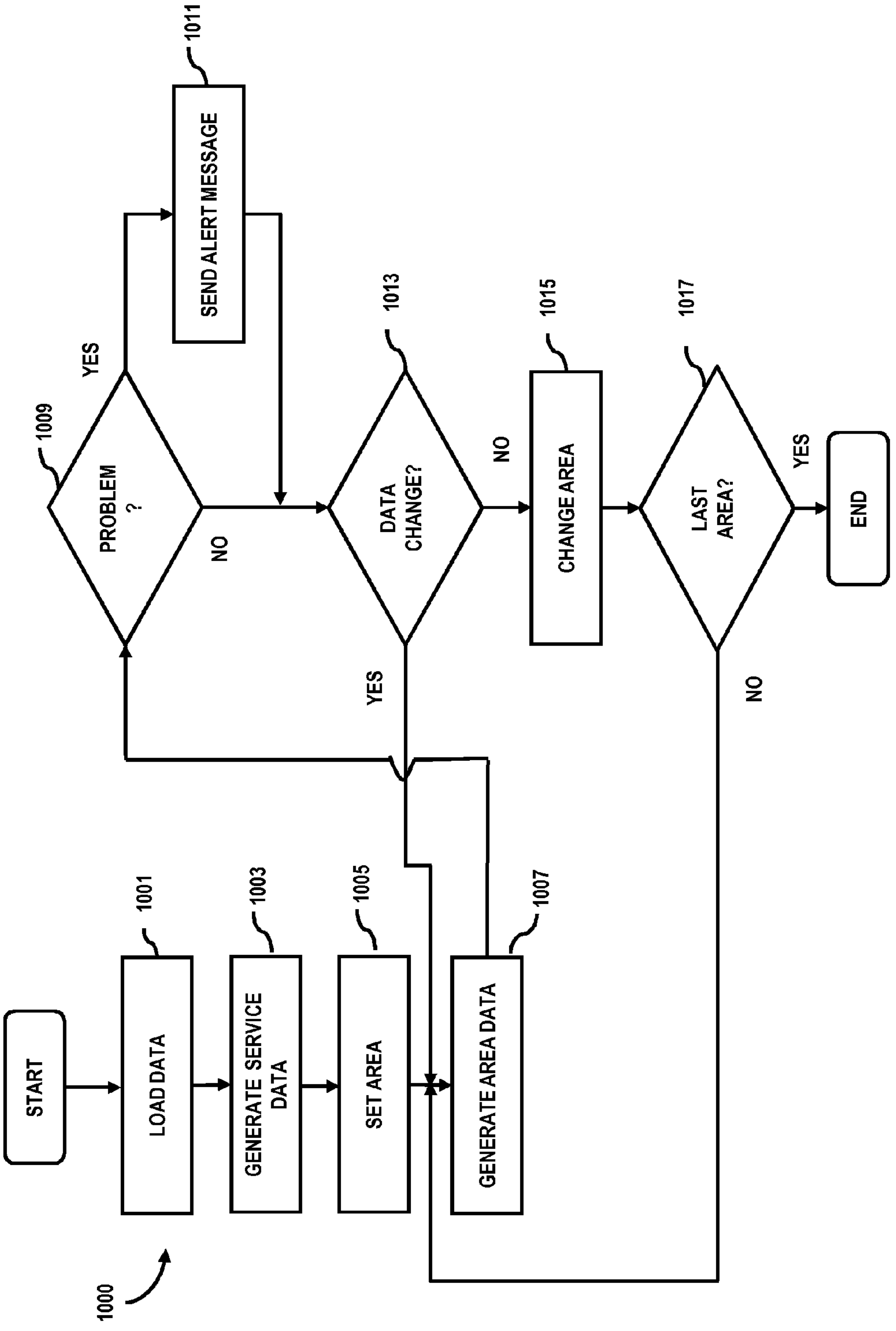
FIG. 10 is a flowchart of a process for warning a user of a traffic condition, according to an exemplary embodiment.

FIG. 10 is another example flowchart of a process for warning a user of a traffic condition, according to an exemplary embodiment. For explanatory purposes, process 1000 is described with respect to the platform 111 of FIG. 3. As shown, process 1000 begins with the loading of data, as in step 1001. For example, constellation 131 may provide current GPS data corresponding to the current position of warning platform 111. The GPS data is communicated to communications module 305 as input signal 323, and is then provided to GPS data module 307 via signal 327. Roadway administration system 123 may provide current roadway data corresponding to any roadway construction, etc. The roadway data is communicated to communications module 305 as input signal 323, and is then provided to roadway data module 309 via signal 327. Emergency system 125 may provide current emergency data corresponding to any vehicle accidents, fires, etc. The emergency data is communicated to communications module 305 as input signal 323, and is then provided to emergency data module 311 via signal 327. Weather system 127 may provide data corresponding to weather conditions. The weather data is communicated to communications module 305 as input signal 323, and is then provided to weather data module 313 via signal 327. User network 101 may provide any data from others. The user data is communicated to communications module 305 as input signal 323, and is then provided to user data module 315 via signal 327.

At this time, service data is generated (step 1003). For example, the data from data module 301 is provided to processing module 303. Input processing module 319 may process the original data.

In step 1005, the process 1000 sets an area to examine. For example, map data for the continental United States can be utilized in conjunction with GPS data, whereas any one user within user network 101 may only need to use such map data within a 20 mile radius of that user. As such, input processing module 319 may process data for an initial predetermined area. As will be discussed, this processed area data may then be provided to users within user network 101 that are geographically located within the initial predetermined area.

The data for the set area is then generated, per step 1007. For example, input processing module 319 may then generate a map using GPS data as provided GPS data module 307. Input processing module 319 may then modify the map to indicate any car accidents, road construction, bad weather or other incidents that occur within the set area, as indicated from data from roadway data module 309, emergency data module 311, weather data module or user data module, respectively.

It is then determined whether there is a problem, as in step 1009. For example, referring to FIG. 9A, using vehicle 915. At time $t_0$, there is no problem, i.e., no event to be reported. However, referring to FIG. 9B, at time $t_1$, a police officer may provide data corresponding to the traffic accident that occurs at location 923 on road 909. In other words, emergency system 125 may provide emergency data to warning platform 111. Input processing module 319 would then use this new emergency data to determine that a traffic condition lies within travel route 921. This even is a problem, i.e., a traffic condition needs to be reported.

If it is determined that a problem exists, then an announcement or notification is sent, per step 1011. For example, input processing module 319 may generate a traffic condition warning to be transmitted to any communication devices within user network 101. Using the example of FIGS. 9A-9C, input processing module 319 may generate a warning that an accident has occurred at location 923 on road 909. Further, input processing module 319 may additional generate a warning of low visibility around the area of the accident as a result of fog. Output module 321 would format the traffic condition warning as needed, and communications module 305 would transmit the traffic condition warning to the communication devices of within user network 101 that are with the set area.

If it is determined that no problem exists (or after an announcement is sent (step 1011)), the process 1000 then determines whether the data has been changed (step 1013). For example, at any point, any of roadway administration system 123, emergency system 125, weather system 127 or user network 101 may update (or provide new/additional) data. For example, a user within user network 101 may witness a vehicle accident that occurs after warning platform 111 is populated with data. This user may then provide new data corresponding to the location of the accident. As such, this new "accident" data may be provided to input module 317.

If the data has been changed, then the area data is regenerated with the new data (1009). For example, in some embodiments, the new data is provided to input module 317 via data module 301. In these cases, the respective data modules within data module 301 may update their data accordingly. For purposes of explanation, in this example, emergency data module 311 may update its data to take into account the new accident as reported by the user that witnessed the accident, and that is within user network 101. In other embodiments, the new data is provided to input module 317 from communications module 305 via signal 329.

Returning to FIG. 10, if the data has not been changed, then the area may be modified (step 1015). For example, if input processing module 319 does not receive any changes to the data, then no events need to be considered. In these situations, a new geographical area may need to be considered. Input processing module 319 may then process a new geographical area to provide warning services to other users within user network 101. Of course in some embodiments, a single geographical area is the only area that is constantly being considered. However, for purposes of explanation, consider the embodiments where a single large geographical area is divided into smaller sub-areas.

In step 1017, it is then determined whether the current area is the last area. Input processing module 319 may determine that the current geographical area for monitoring is the last area. If the current area is not the last area, then the next area is set (step 1005). For example, an entire geographical area may be partitioned into cells, such as the cells used by a cell phone network. In such an example, warning platform 111 may move from cell to cell to monitor for events.

With process 1000, a user of warning platform 111 may quickly and easily be notified of events within their geographical proximity.

Figure 11:
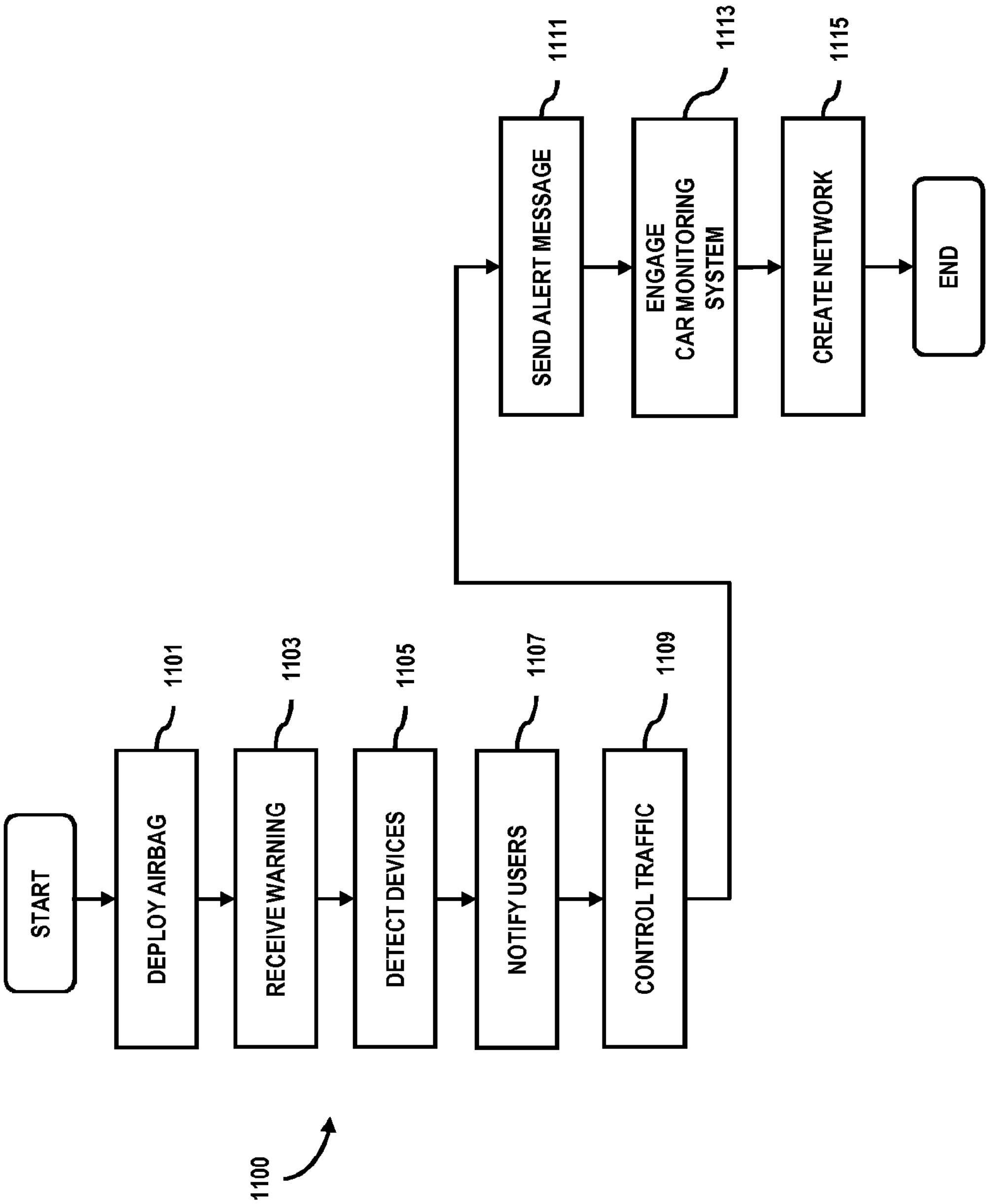
FIG. 11 is a flowchart of a process for alerting a driver via a mobile device, according to an exemplary embodiment.

FIG. 11 is a flowchart of a process 1100 for alerting a driver via a mobile device, according to an exemplary embodiment. Process 1100, as in step 1101, involves occurrence of traffic condition wherein an airbag is deployed as a result of the accident. Then a warning of a traffic condition is received (step 1103). For example, for purposes of explanation, the vehicle 401 in the traffic accident includes a communication system that transmits event information and vehicle diagnostics. Here, the deployment of the airbag initiates transmission of a message that the airbag has been deployed. Returning to FIG. 3, the message that the airbag has been deployed, in addition to the location of the vehicle, is provided to input processing module 319. This message is an indication of a traffic condition, e.g., a traffic accident, at the location of the vehicle.

At this time, other devices are detected (as in step 1105). For example, using GPS data provided by location data module 307, and user location data provided by user data module 315, input processing module 319 locates all devices within user network 101 that are located near the traffic accident at location 923 on road 909 (i.e., near the location of the vehicle that deployed the airbag). Returning to FIG. 9B, the located devices within user network 101 that are located near the traffic accident at location 923 on road 929 include vehicle 913 and vehicle 915.

In step 1107, the users are then notified. For example, input processing module 319 sends out a traffic condition warning to all communication devices within user network 101 that are located near the traffic accident at location 923 on road 909. The alert message may be based on the position, direction and speed of travel of the communication devices (i.e., the position, direction and speed of travel of the vehicle in which the communication devices are residing). The alert message may be any known type of warning, non-limiting examples of which include audio and visual warnings. In an example embodiment, a test message is sent to the communication devices indicating that a traffic accident has occurred at location 923 on road 909.

In step 1109, traffic may then be controlled. For example, based on the position, direction and speed of travel of the communication devices, input processing module 319 may provide suggested alternative travel routes. Returning to FIG. 9C, in this example, a traffic condition warning to vehicle 915 may suggest changing the travel route to that of travel route 915. Alternatively, a traffic condition warning to vehicle 913 may suggest maintaining travel route 919 as vehicle 913 is too close to the accident to change routes. Further, in some embodiments, input processing module 319 may provide the alert message to roadway administration system 123. In these situations, roadway administration system 123 may modify timings of traffic lights in response to the accident to accommodate changes in the traffic.

Accordingly, an alert message is sent (step 1111). For example, all motorists may additionally receive a traffic condition alert message describing the vehicle accident. Vehicles that may be approaching the traffic accident at location 923 on road 909 may then move to the side of the road to reduce the likelihood of a pileup.

In step 1113, the vehicle's monitoring system may then be activated. In some embodiments, vehicle diagnostic features may be utilized for emergency avoidance. For example, some vehicles have on-board diagnostic and control systems that may be remotely controlled. In some embodiments, input processing module 319 may provide instructions to a vehicle's on-board diagnostic and control systems in order to turn off the engine, control the steering and/or brakes to assist in pile-up avoidance.

In step 1115, a network is then created and is located near the traffic accident at location 923 on road 909. Mobile devices may communicate among themselves to coordinate pile-up avoidance. Further, if any of the vehicles corresponding to the communication devices within user network 101 that are located near the traffic accident at location 923 on road 909 include accident avoidance/detection technology, this may be shared with the remaining communication devices within user network 101 that are located near the traffic accident at location 923 on road 909.

With above process 1100, traffic conditions, such as pile-ups, may be readily avoided so that the approaching vehicles may either alter the travel route or drive with greater care.

Figure 12:
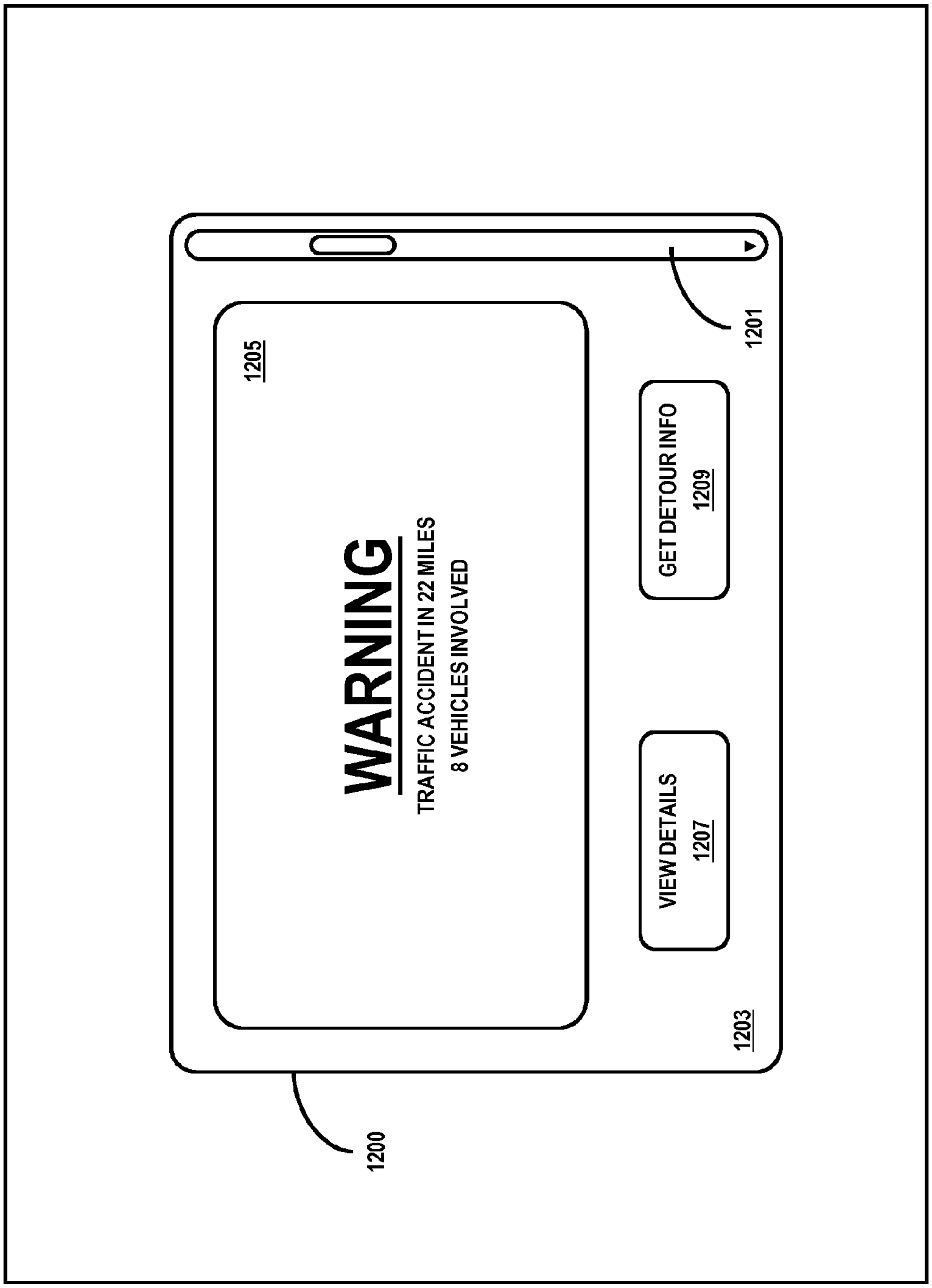
FIG. 12 is a graphical user interface for warning a user of a mobile device, according to an exemplary embodiment.

FIG. 12 is a graphical user interface for warning a user of a mobile device, according to an exemplary embodiment. In this example, it is assumed that GUI 1200 is provided to a user (or subscriber) of the remote configuration services of system 100 via communications module 305. It is also assumed that the subscriber is associated with one or more mobile devices, such as mobile device 133.

One or more navigational elements/fields, such as scrollbar 1201, may be provided and configured to indicate the existence of additional information, entries, fields, buttons, menus, etc., not displayed, but navigably available, as well as facilitate interface usability. Accordingly, the subscriber may browse to additional information, entries, fields, etc., via, for instance, an input interface of a suitable client device, e.g., a cursor control. One or more fixed focus states (e.g., borders) and/or distinctive magnification features, e.g., color, brightness, bolding, font type, text size, etc., may be used to convey the device(s) being designated as warning and to be remotely configured, as well as provide an indication of those features, functions, or states being "currently" employed.

As seen in FIG. 12, configuration region 1203 may be configured to provide one or more menus, options, instructions, buttons, etc., for effectuating or describing one or more setting parameters. For instance, region 1203 provides an instruction region 1205 informing the subscriber of a nearby traffic accident. In this example, instruction region 1205 provides a warning statement informing the subscriber that a traffic accident is in 22 miles of the current course, wherein the accident involves 8 vehicles. It is noted, however, that other instructions, warnings, inputs, selections, etc., may be provided. Interaction with interactive element 1207 may be configured to view details of the accident, whereas interaction with interactive element 1209 may be configured to provide detour information to the user.

According to additional exemplary embodiments, GUI 1200 may include various other regions, such as a user name region and a password region for enabling subscribers to "log on" and obtain access to the features and functions of GUI 1200. In alternative embodiments, regions may be configured to correspond to other associated authentication information. It is noted that a "WELCOME, USERNAME" message may be presented to authenticated subscribers once sufficient authentication (or authorization) information is input. Still further, GUI 1200 may include a service provider logo region to illustrate (or otherwise present) the subscriber with a logo of the service provider of the remote configuration services of system 100, as well as include other suitable (or equivalent) regions, such as advertisement region, etc.

The processes described herein for generating traffic warnings may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 13:
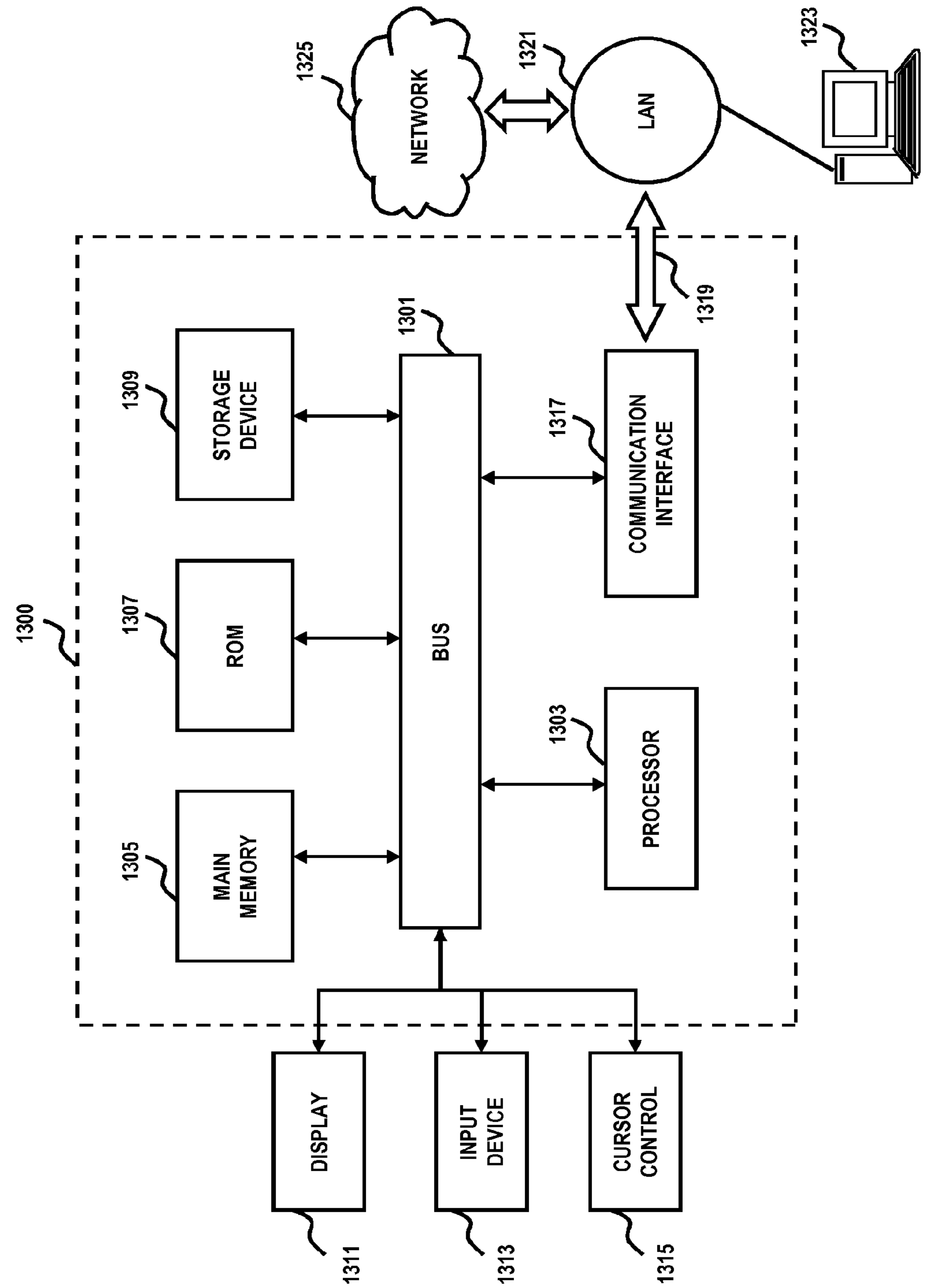
FIG. 13 is a diagram of a computer system that can be used to implement various exemplary embodiments.

FIG. 13 illustrates computing hardware (e.g., computer system) 1300 upon which exemplary embodiments can be implemented. The computer system 1300 includes a bus 1301 or other communication mechanism for communicating information and a processor 1303 coupled to the bus 1301 for processing information. The computer system 1300 also includes main memory 1305, such as a random access memory (RAM) or other dynamic storage device, coupled to the bus 1301 for storing information and instructions to be executed by the processor 1303. Main memory 1305 can also be used for storing temporary variables or other intermediate information during execution of instructions by the processor 1303. The computer system 1300 may further include a read only memory (ROM) 1307 or other static storage device coupled to the bus 1301 for storing static information and instructions for the processor 1303. A storage device 1309, such as a magnetic disk or optical disk, is coupled to the bus 1301 for persistently storing information and instructions.

The computer system 1300 may be coupled via the bus 1301 to a display 1311, such as a cathode ray tube (CRT), liquid crystal display, active matrix display, or plasma display, for displaying information to a computer user. An input device 1313, such as a keyboard including alphanumeric and other keys, is coupled to the bus 1301 for communicating information and command selections to the processor 1303. Another type of user input device is a cursor control 1315, such as a mouse, a trackball, or cursor direction keys, for communicating direction information and command selections to the processor 1303 and for controlling cursor movement on the display 1311.

According to an exemplary embodiment, the processes described herein are performed by the computer system 1300, in response to the processor 1303 executing an arrangement of instructions contained in main memory 1305. Such instructions can be read into main memory 1305 from another computer-readable medium, such as the storage device 1309. Execution of the arrangement of instructions contained in main memory 1305 causes the processor 1303 to perform the process steps described herein. One or more processors in a multi-processing arrangement may also be employed to execute the instructions contained in main memory 1305. In alternative embodiments, hard-wired circuitry may be used in place of or in combination with software instructions to implement exemplary embodiments. Thus, exemplary embodiments are not limited to any specific combination of hardware circuitry and software.

Figure 14:
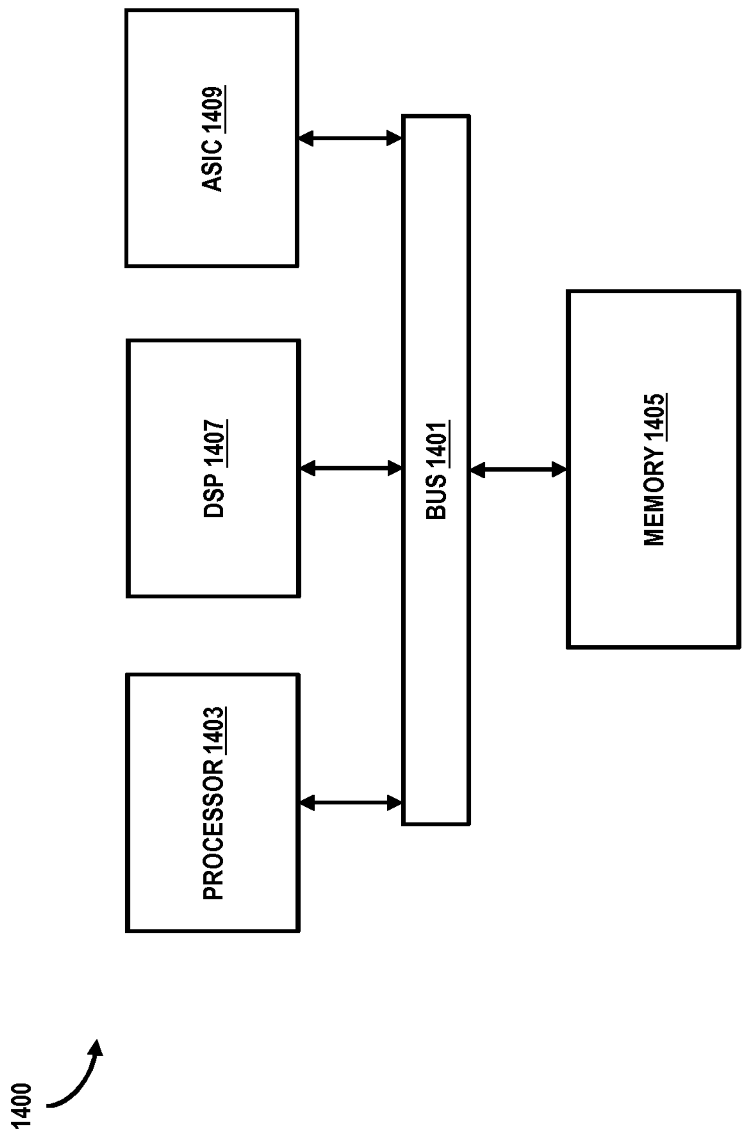
FIG. 14 is a diagram of a chip set that can be used to implement various exemplary embodiments.

The computer system 1300 also includes a communication interface 1317 coupled to bus 1301. The communication interface 1317 provides a two-way data communication coupling to a network link 1319 connected to a local network 1321. For example, the communication interface 1317 may be a digital subscriber line (DSL) card or modem, an integrated services digital network (ISDN) card, a cable modem, a telephone modem, or any other communication interface to provide a data communication connection to a corresponding type of communication line. As another example, communication interface 1317 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1317 sends and receives electrical, electromagnetic, or optical signals that carry digital data streams representing various types of information. Further, the communication interface 1317 can include peripheral interface devices, such as a Universal Serial Bus (USB) interface, a PCMCIA (Personal Computer Memory Card International Association) interface, etc. Although a single communication interface 1317 is depicted in FIG. 14, multiple communication interfaces can also be employed.

The network link 1319 typically provides data communication through one or more networks to other data devices. For example, the network link 1319 may provide a connection through local network 1321 to a host computer 1323, which has connectivity to a network 1325 (e.g. a wide area network (WAN) or the global packet data communication network now commonly referred to as the "Internet") or to data equipment operated by a service provider. The local network 1321 and the network 1325 both use electrical, electromagnetic, or optical signals to convey information and instructions. The signals through the various networks and the signals on the network link 1319 and through the communication interface 1317, which communicate digital data with the computer system 1300, are exemplary forms of carrier waves bearing the information and instructions.

The computer system 1300 can send messages and receive data, including program code, through the network(s), the network link 1319, and the communication interface 1317. In the Internet example, a server (not shown) might transmit requested code belonging to an application program for implementing an exemplary embodiment through the network 1325, the local network 1321 and the communication interface 1317. The processor 1303 may execute the transmitted code while being received and/or store the code in the storage device 1309, or other non-volatile storage for later execution. In this manner, the computer system 1300 may obtain application code in the form of a carrier wave.

The term "computer-readable medium" as used herein refers to any medium that participates in providing instructions to the processor 1303 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 1309. Volatile media include dynamic memory, such as main memory 1305. Transmission media include coaxial cables, copper wire and fiber optics, including the wires that comprise the bus 1401. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 14 illustrates a chip set 1400 upon which an embodiment of the invention may be implemented. Chip set 1400 is programmed to present a slideshow as described herein and includes, for instance, the processor and memory components described with respect to FIG. 14 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1400, or a portion thereof, constitutes a means for performing one or more steps of FIGS. 2, 6-8, 10, and 11.

In one embodiment, the chip set 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to presenting a slideshow via a set-top box. The memory 1405 also stores the data associated with or generated by the execution of the inventive steps.

Implementations described herein provide a generic ("one size fits all") interface gateway (integration layer) that can be used to implement any type of interface for various kinds of systems, such as ERP systems (e.g., SAP, PeopleSoft, etc.), Business Warehouse systems, Legacy systems, web services, business-to-business services, etc. The generic interface gateway includes a services component to implement a plurality of different types of services for processing data received at the interface gateway, the plurality of services being implemented as at least two of an Oracle Data Integration (ODI) service, a SAP service, a Java Web Service, or a Unix shell script. In addition, the generic interface gateway can handle single payload requests, as well as batch request, where the payload is very big. The generic interface gateway may include a metadata-driven orchestration component that acts as the heart of the interface gateway. Users may configure an interface for the interface gateway by configuring the metadata-driven orchestration component to invoke whatever types of services are needed for processing the collected and workflow data. The orchestration component may read the metadata for the given interface to be executed and orchestrate the services in the defined order. The orchestration component may also decide whether the services can be triggered in sequential or parallel mode.

In accordance with aspects of the present invention, deadly pileups may be prevented by providing timely warnings to drivers, who could become involved with a pileup in the event a crash occurs ahead of them. This will enable drivers, who are behind crashed vehicles, to avoid adding to the mayhem by slowing down and steering away from the crash site. Further, aspects of the present invention additionally alert drivers when they are driving in an accident prone area or are approaching a signal with a high number of traffic accidents. In such cases, drivers may be able to drive with a higher state of alert. Aspects of the present invention additionally may be alerted to accident causing conditions, non-limiting examples of which included fog, smoke or a weaving motorist.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:

monitoring for one or more sensor messages from a plurality of mobile devices transported by a plurality of vehicles;

determining a traffic condition based on the one or more sensor messages;

determining a location of the traffic condition based on position information of one or more of the plurality of mobile devices;

selecting mobile devices based on a comparison of a predetermined proximity and a proximity of each of the plurality of mobile devices to the location of the traffic condition;

generating an alert message in response to the traffic condition; and notifying the selected mobile devices with the alert message.

2. A method according to claim 1, further comprising:

collecting environmental data for use in the determination of the traffic condition.

3. A method according to claim 2, wherein the mobile devices includes a plurality of sensors configured to output travel data that includes speed information, direction information, timing information, or a combination thereof, the one or more sensor messages specifying the travel data.

4. A method according to claim 3, further comprising:

determining a driving pattern based on the travel data and the environmental data; and determining that the driving pattern is correlated to a predetermined abnormal pattern.

5. A method according to claim 1, further comprising:

receiving vehicle sensor information from one or more of the vehicles indicating a deployment of an airbag, wherein the traffic condition is determined based further on the vehicle sensor information.

6. A method according to claim 1, further comprising:

generating a control message to control one or more of the vehicles in response to the determined traffic condition, wherein the control message provides instructions to turn-off an engine, control a steering, control a braking, or a combination thereof.

7. A method according to claim 1, wherein the determination of the traffic condition is performed at one of the mobile devices, further comprising:

establishing a communication link with one or more of the selected mobile devices to receive the sensor messages and to forward the alert message.

8. An apparatus comprising:

at least one processor; and at least one memory including computer program code for one or more programs, the at least one memory and the computer program code configured to, with the at least one processor, cause the apparatus to perform at least the following, monitor for one or more sensor messages from a plurality of mobile devices transported by a plurality of vehicles, determine a traffic condition based on the one or more sensor messages, determine a location of the traffic condition based on position information of one or more of the plurality of mobile devices, select mobile devices based on a comparison of a predetermined proximity and a proximity of each of the plurality of mobile devices to the location of the traffic condition, generate an alert message in response to the traffic condition, and notify the selected mobile devices with the alert message.

9. An apparatus according to claim 8, wherein the apparatus is further caused to:

collect environmental data for use in the determination of the traffic condition.

10. An apparatus according to claim 9, wherein the mobile devices includes a plurality of sensors configured to output travel data that includes speed information, direction information, timing information, or a combination thereof, the one or more sensor messages specifying the travel data.

11. An apparatus according to claim 10, wherein the apparatus is further caused to:

determine a driving pattern based on the travel data and the environmental data; and determine that the driving pattern is correlated to a predetermined abnormal pattern.

12. An apparatus according to claim 8, wherein the apparatus is further caused to:

receive vehicle sensor information from one or more of the vehicles, wherein the traffic condition is determined based further on the vehicle sensor information.

13. An apparatus according to claim 8, wherein the apparatus is further caused to:

generate a control message to control one or more of the vehicles in response to the determined traffic condition.

14. An apparatus according to claim 8, wherein the determination of the traffic condition is performed at one of the mobile devices, and the apparatus is further caused to:

establish a communication link with one or more of the selected mobile devices to receive the sensor messages and to forward the alert message.

15. A method comprising:

receiving, by a processor, one or more sensor signals from one or more sensors within a mobile device transported by a vehicle;

collecting environmental data related to a location of the mobile device;

determining a location of a traffic condition based on the one or more sensor signals and the environmental data;

generating an alert message in response to the traffic condition; and establishing a communication session with another mobile device based on a comparison of a predetermined proximity and a proximity of the another mobile device to the location of the traffic condition to transmit the alert message.

16. A method according to claim 15, wherein the sensors are configured to output travel data that includes speed information, direction information, timing information, or a combination thereof, the one or more sensor messages specifying the travel data.

17. A method according to claim 16, further comprising:

determining a driving pattern based on the travel data and the environmental data; and determining that the driving pattern is correlated to a predetermined abnormal pattern.

18. A method according to claim 15, further comprising:

receiving vehicle sensor information from the vehicle, wherein the traffic condition is determined based further on the vehicle sensor information.

19. An apparatus comprising:

at least one processor; and at least one memory including computer program code for one or more programs, the at least one memory and the computer program code configured to, with the at least one processor, cause the apparatus to perform at least the following, receive one or more sensor signals from one or more sensors within a mobile device transported by a vehicle, collect environmental data related to a location of the mobile device, determine a location of a traffic condition based on the one or more sensor signals and the environmental data, generate an alert message in response to the traffic condition, and establish a communication session with another mobile device based on a comparison of a predetermined proximity and a proximity of the another mobile device to the location of the traffic condition to transmit the alert message.

20. An apparatus according to claim 19, wherein the sensors are configured to output travel data that includes speed information, direction information, timing information, or a combination thereof, the one or more sensor messages specifying the travel data.

21. An apparatus according to claim 20, wherein the apparatus is further caused to:

determine a driving pattern based on the travel data and the environmental data; and determine that the driving pattern is correlated to a predetermined abnormal pattern.

22. An apparatus according to claim 19, wherein the apparatus is further caused to:

receive vehicle sensor information from the vehicle, wherein the traffic condition is determined based further on the vehicle sensor information.

* * * * *